United States Patent
Kim et al.

(10) Patent No.: US 11,881,554 B2
(45) Date of Patent: Jan. 23, 2024

(54) POLYMER ELECTROLYTE AND METHOD FOR PRODUCING SAME

(71) Applicants: LG CHEM, LTD., Seoul (KR); POSTECH ACADEMY-INDUSTRY FOUNDATION, Pohang-si (KR)

(72) Inventors: Daeil Kim, Daejeon (KR); Moon Jeong Park, Pohang-si (KR); Jonghyun Chae, Daejeon (KR); Ha Young Jung, Cheonan-si (KR); Suhwan Kim, Daejeon (KR); Sung Chul Lim, Daejeon (KR); Jihoon Ahn, Daejeon (KR)

(73) Assignees: LG ENERGY SOLUTION, LTD., Seoul (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 314 days.

(21) Appl. No.: 16/954,836

(22) PCT Filed: Jul. 24, 2019

(86) PCT No.: PCT/KR2019/009179
§ 371 (c)(1),
(2) Date: Jun. 17, 2020

(87) PCT Pub. No.: WO2020/022777
PCT Pub. Date: Jan. 30, 2020

(65) Prior Publication Data
US 2021/0091410 A1    Mar. 25, 2021

(30) Foreign Application Priority Data
Jul. 25, 2018   (KR) .................. 10-2018-0086287

(51) Int. Cl.
*H01M 10/0565* (2010.01)
*C08G 65/333* (2006.01)
*C08G 65/335* (2006.01)
*H01M 10/0525* (2010.01)

(52) U.S. Cl.
CPC .... *H01M 10/0565* (2013.01); *C08G 65/3355* (2013.01); *C08G 65/33368* (2013.01); *H01M 10/0525* (2013.01); *H01M 2300/0028* (2013.01); *H01M 2300/0065* (2013.01); *H01M 2300/0082* (2013.01)

(58) Field of Classification Search
CPC ......... H01M 10/0565; H01M 10/0525; H01M 2300/0065; H01M 2300/0082; H01M 2300/0085; C08G 65/331–337
See application file for complete search history.

(56) References Cited

U.S. PATENT DOCUMENTS

| | | | | |
|---|---|---|---|---|
| 6,667,106 B1* | 12/2003 | Kii | ..................... | H01M 10/0565 429/300 |
| 2002/0071987 A1* | 6/2002 | Kezuka | ............... | H01M 10/052 429/128 |
| 2002/0110738 A1* | 8/2002 | Takizawa | .......... | H01M 10/0565 429/317 |
| 2004/0248011 A1* | 12/2004 | Asao | ..................... | H01M 4/386 429/231.95 |
| 2009/0148777 A1 | 6/2009 | Song et al. | | |
| 2011/0206994 A1* | 8/2011 | Balsara | ............. | H01M 10/0565 977/788 |
| 2016/0308245 A1* | 10/2016 | Xu | .......................... | C08L 71/02 |
| 2017/0327691 A1* | 11/2017 | Yu | ............................. | C09C 1/56 |
| 2019/0379085 A1* | 12/2019 | Rastegar | ........... | H01M 10/0565 |
| 2019/0386340 A1 | 12/2019 | Kim et al. | | |

FOREIGN PATENT DOCUMENTS

| | | |
|---|---|---|
| CN | 110402516 A | 11/2019 |
| EP | 3 595 070 A2 | 1/2020 |
| JP | 62051611 A * | 3/1987 |
| JP | 6-236770 A | 8/1994 |
| JP | 2001-43898 A | 2/2001 |
| JP | 2001-253921 A | 9/2001 |
| JP | 2002-334698 A | 11/2002 |
| JP | 2007-184116 A | 7/2007 |
| JP | 2011-506629 A | 3/2011 |
| JP | 2011-90957 A | 5/2011 |

(Continued)

OTHER PUBLICATIONS

Brunet et al., "Engineering of Microcrystaline Solid-State Networks Using Cross-Linked γ-Zirconium Phosphate/Hypophosphite with Nonrigid Polyethylenoxadiphosphonates. Easy Access to Porously Dynamic Solids with Polar/ Nonpolar Pores", Chem. Mater., vol. 17, 2005, pp. 1424-1433.
Dirks et al., "Monitoring Protein-Polymer Conjugation by a Fluorogenic Cu(I)-Catalyzed Azide-Alkyne 1,3-Dipolar Cycloaddition", Bioconjugate Chem., vol. 20, 2009, pp. 1129-1138.
Hu et al., "Synthesis of ammonium bisphosphonate monomers and polymers", Polymer, vol. 54, 2013, pp. 3188-3197.

(Continued)

*Primary Examiner* — Jeremiah R Smith
(74) *Attorney, Agent, or Firm* — Birch, Stewart, Kolach & Birch, LLP

(57) ABSTRACT

A polymer electrolyte is provided, which includes a polymer including an ethylene oxide unit; and a lithium salt, wherein the terminal of the polymer is substituted with one to four functional groups selected from the group consisting of a nitrogen compound functional group and phosphorus compound functional group, and the terminal of the polymer and the one to four functional groups are linked by one selected from the group consisting of a C2 to C20 alkylene linker, a C2 to C20 ether linker, and a C2 to C20 amine linker. A method for preparing the same is also provided.

8 Claims, 13 Drawing Sheets

(56) References Cited

FOREIGN PATENT DOCUMENTS

| | | | | |
|---|---|---|---|---|
| JP | 2011-243568 | * | 12/2011 | ........ H01M 10/0569 |
| JP | 2011-243568 A | | 12/2011 | |
| JP | 2013-73846 A | | 4/2013 | |
| JP | 2016-138080 A | | 8/2016 | |
| JP | 2016-170992 A | | 9/2016 | |
| KR | 10-1996-0010255 B1 | | 7/1996 | |
| KR | 10-2014-0027671 A | | 3/2014 | |
| KR | 10-2015-0041711 A | | 4/2015 | |
| KR | 10-1639839 B1 | | 7/2016 | |
| KR | 10-2019-0033422 A | | 3/2019 | |
| WO | WO 2010/083325 A1 | | 7/2010 | |
| WO | WO-2018094266 A1 | * | 5/2018 | .......... H01M 4/8663 |

OTHER PUBLICATIONS

International Search Report issued in PCT/KR2019/009179 (PCT/ISA/210), dated Oct. 28, 2019.

Ito et al., "High lithium ionic conductivity of poly(ethylene oxide)s having sulfonate groups on their chain ends", J. Mater. Chem., vol. 7, 1997, 1357-1362.

Jo et al., "Simple Route for Tuning the Morphology and Conductivity of Polymer Electrolytes: One End Functional Group is Enough", ACS Macro Letters, vol. 2, 2013, pp. 990-995.

Jung et al., "Modulating Ion Transport and Self-Assembly of Polymer Electrolytes via End-Group Chemistry", Macromolecules, vol. 50, 2017, pp. 3224-3233.

Extended European Search Report for European Application No. 19841785.9, dated Mar. 1, 2021.

Iliescu et al., "Polymers containing phosphorus groups and poiyerhers: from synthesis to application.", Chemical Central Journal, vol. 6, 2012, pp. 1-13.

Sai et al., "Steric effect on Li+ coordination and transport properties in polyoxetane-based polymer electrolytes bearing nitrile groups," RSC Advances, 2017, 7, pp. 37975-37982.

European Office Action for Appl. No. 19 841 785.9 dated Oct. 31, 2023.

Ghosh, P., "Polymer Science—Fundamentals of Polymer Science, Molecular Weights of Polymers," Polymer Study Centre, Sep 21, 2006, pp. 1-22.

* cited by examiner

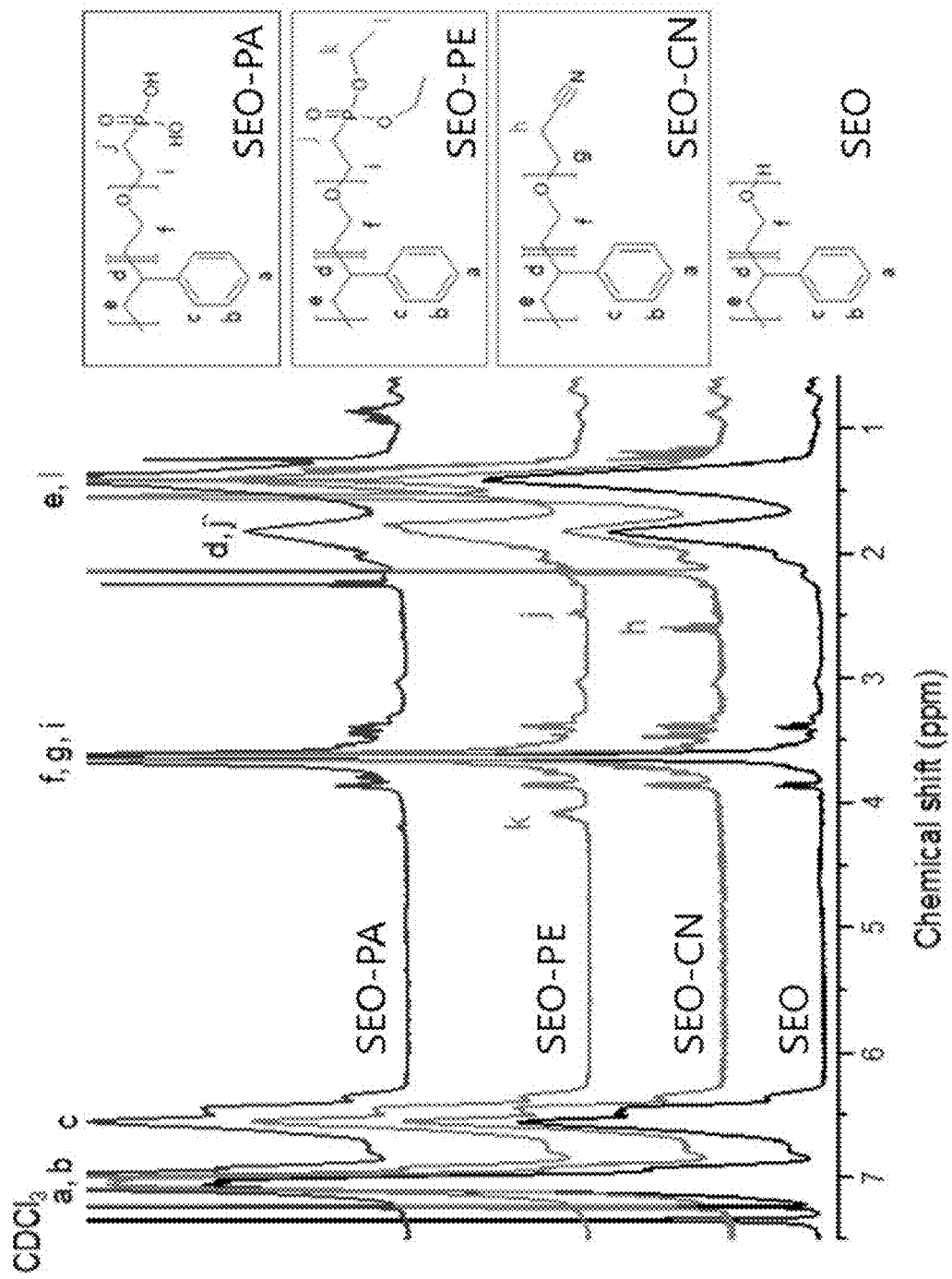
[Figure 1]

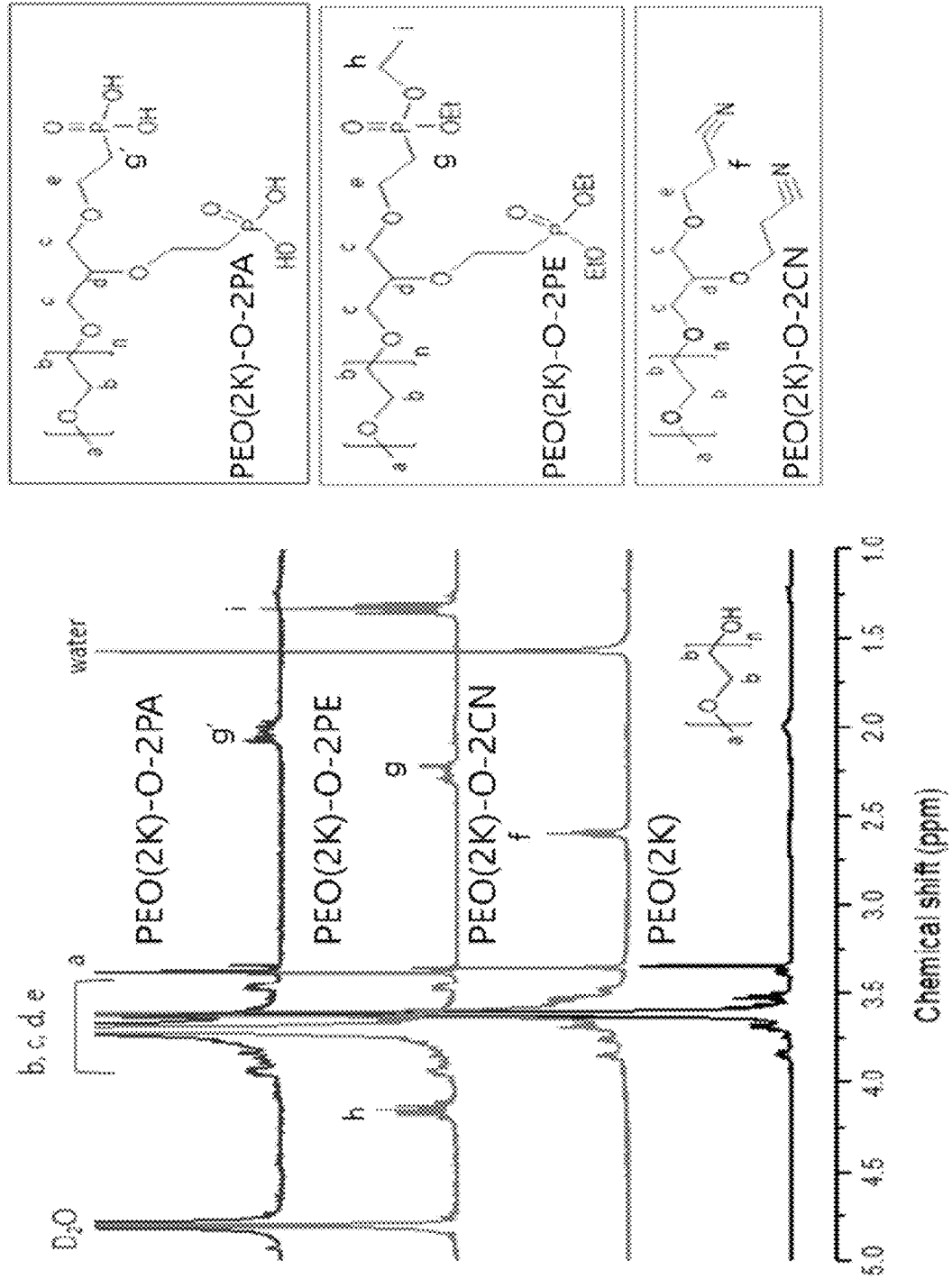
[Figure 2]

[Figure 3]
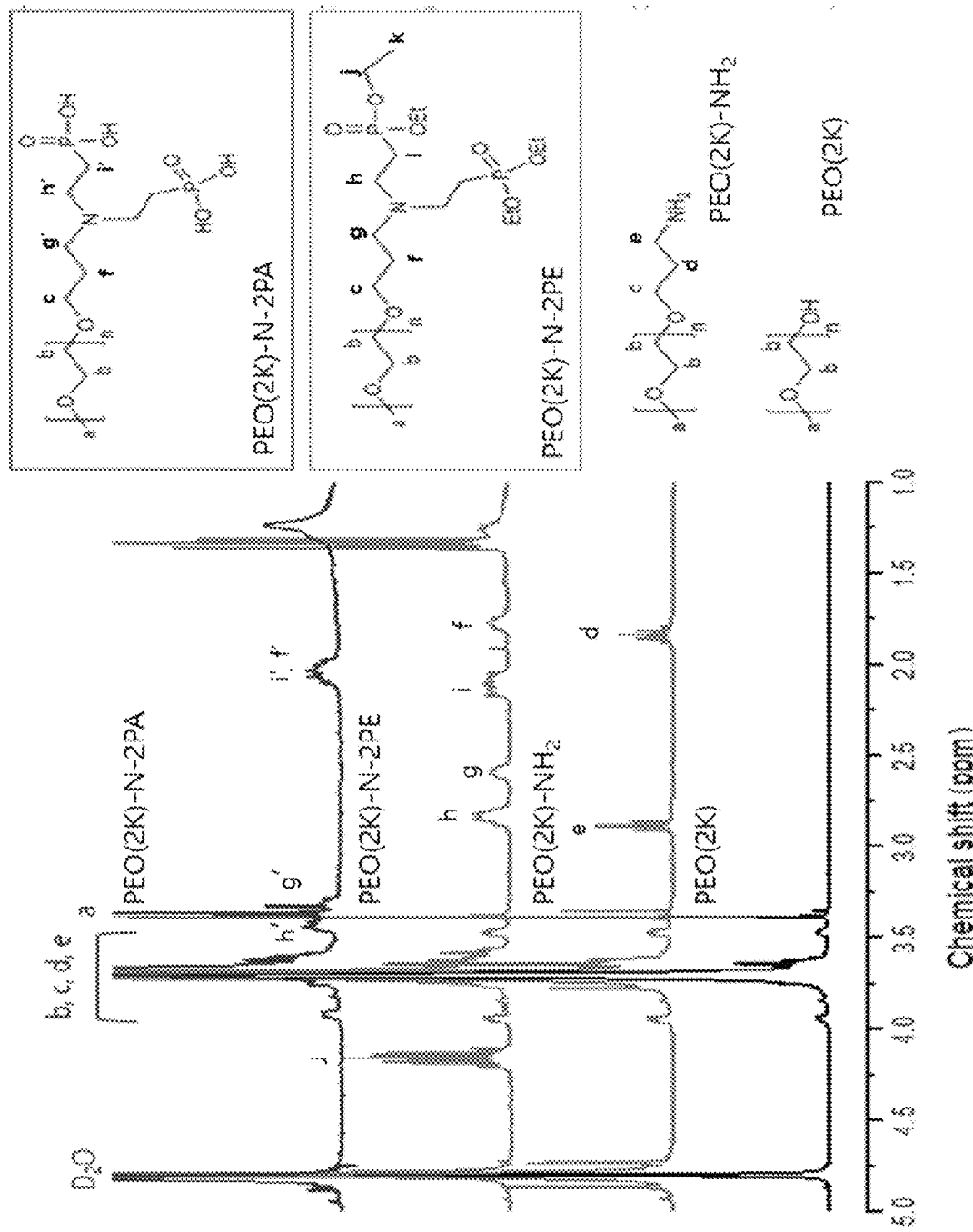

[Figure 4]
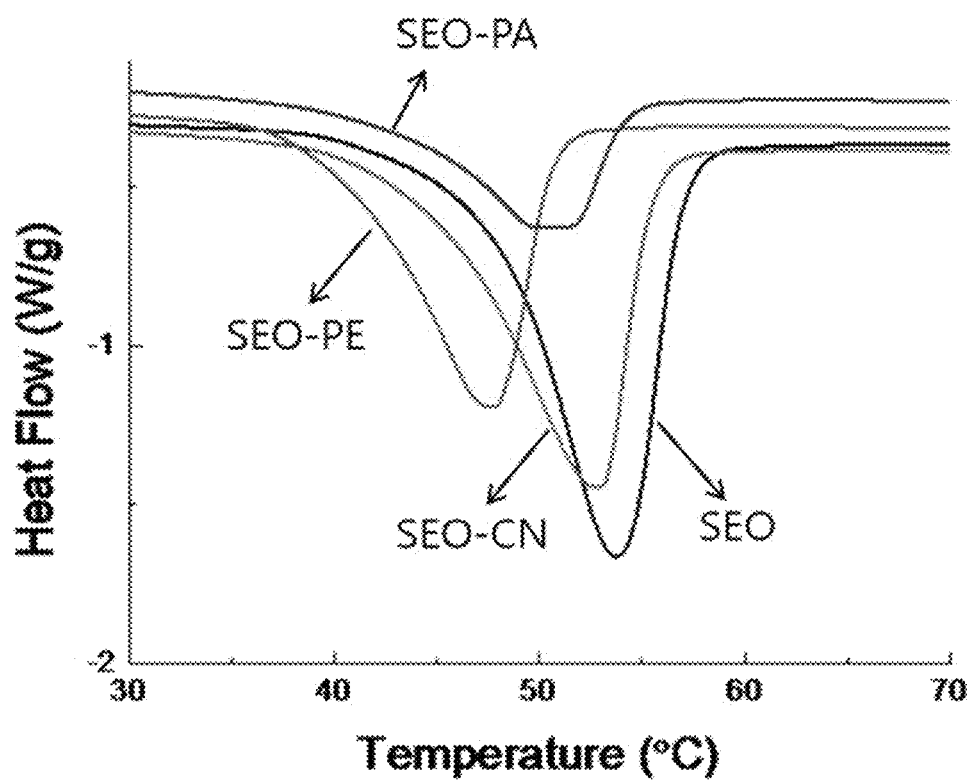

[Figure 5]
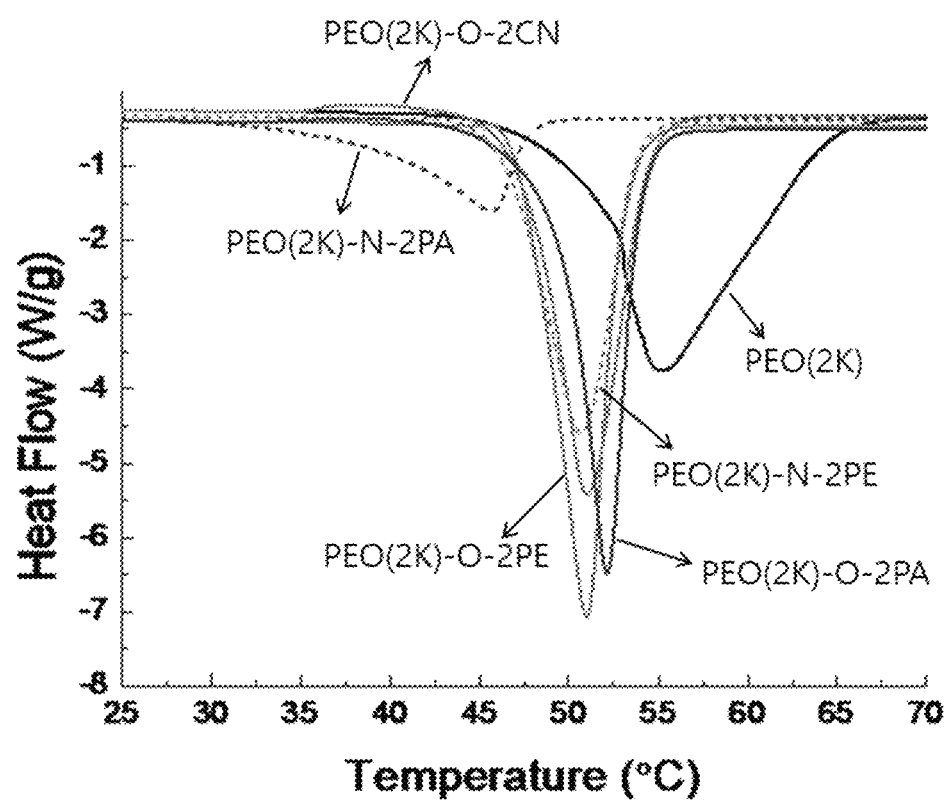

[Figure 6]
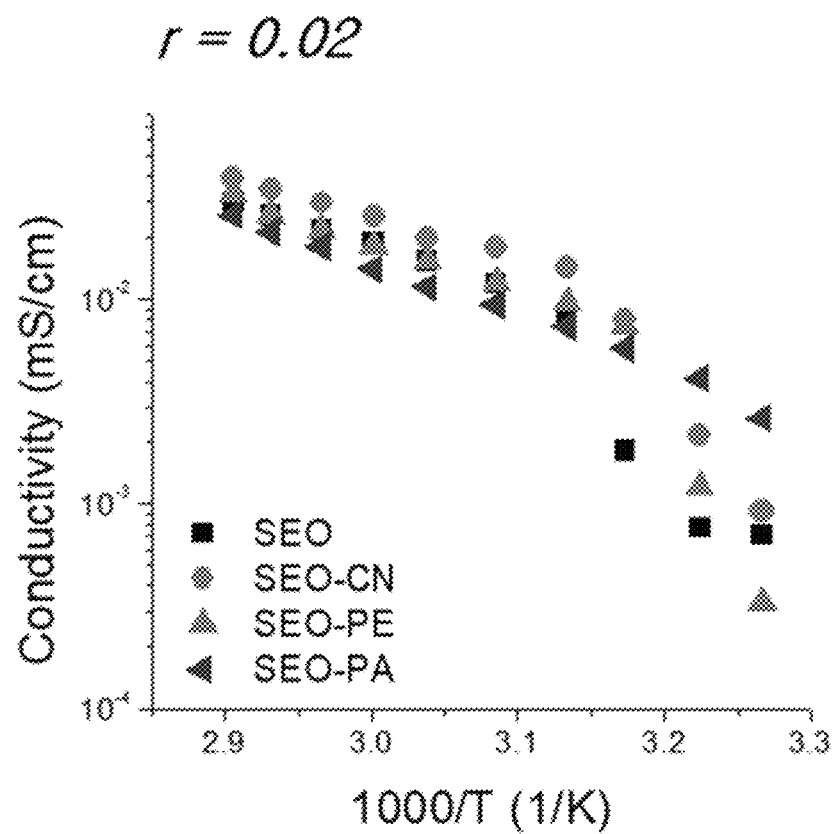

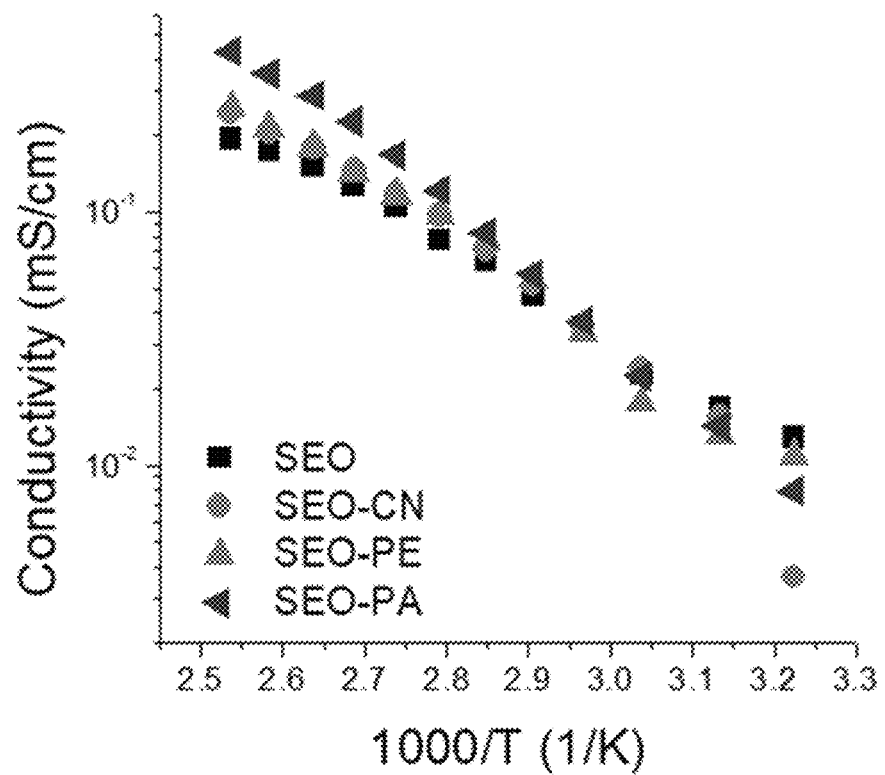
[Figure 7]

[Figure 8]
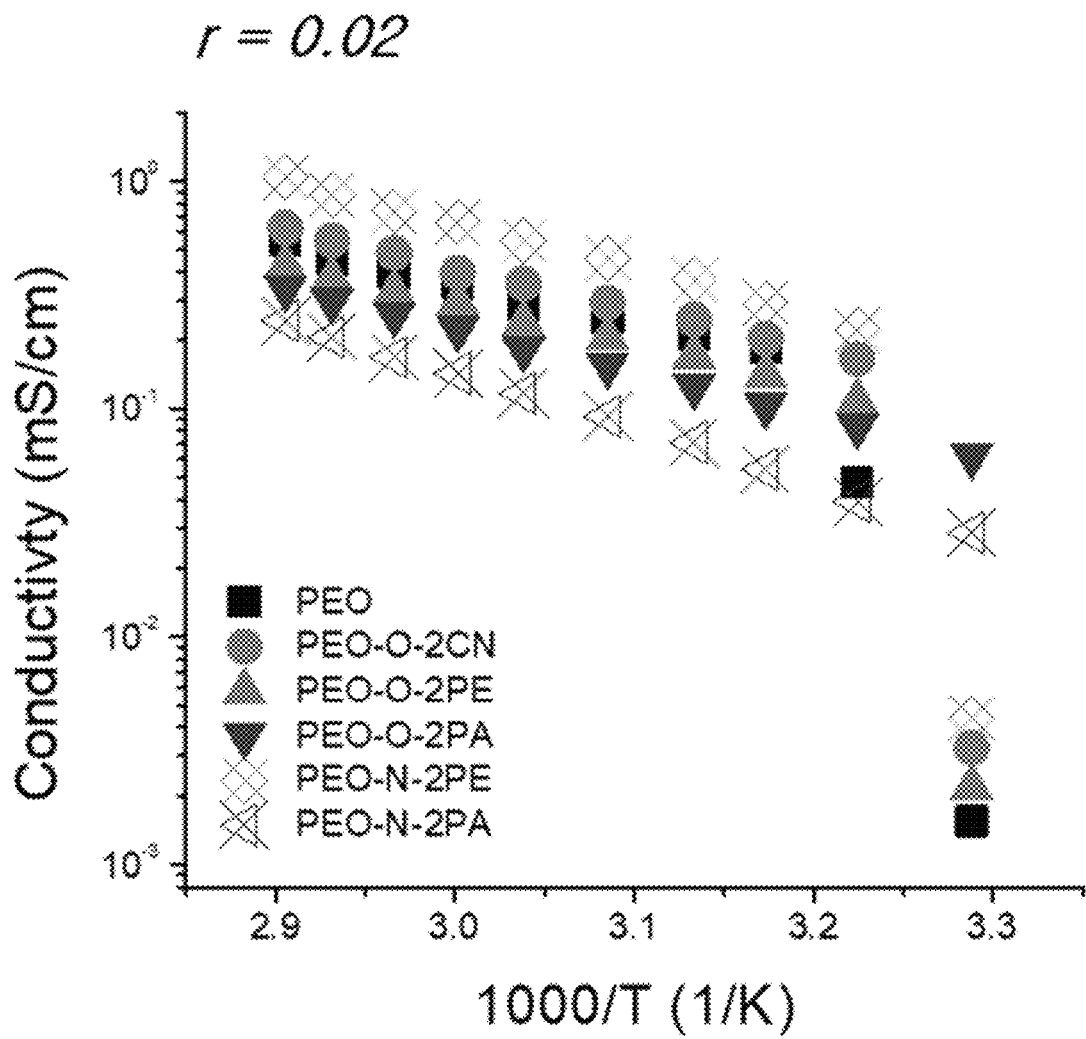

[Figure 9]
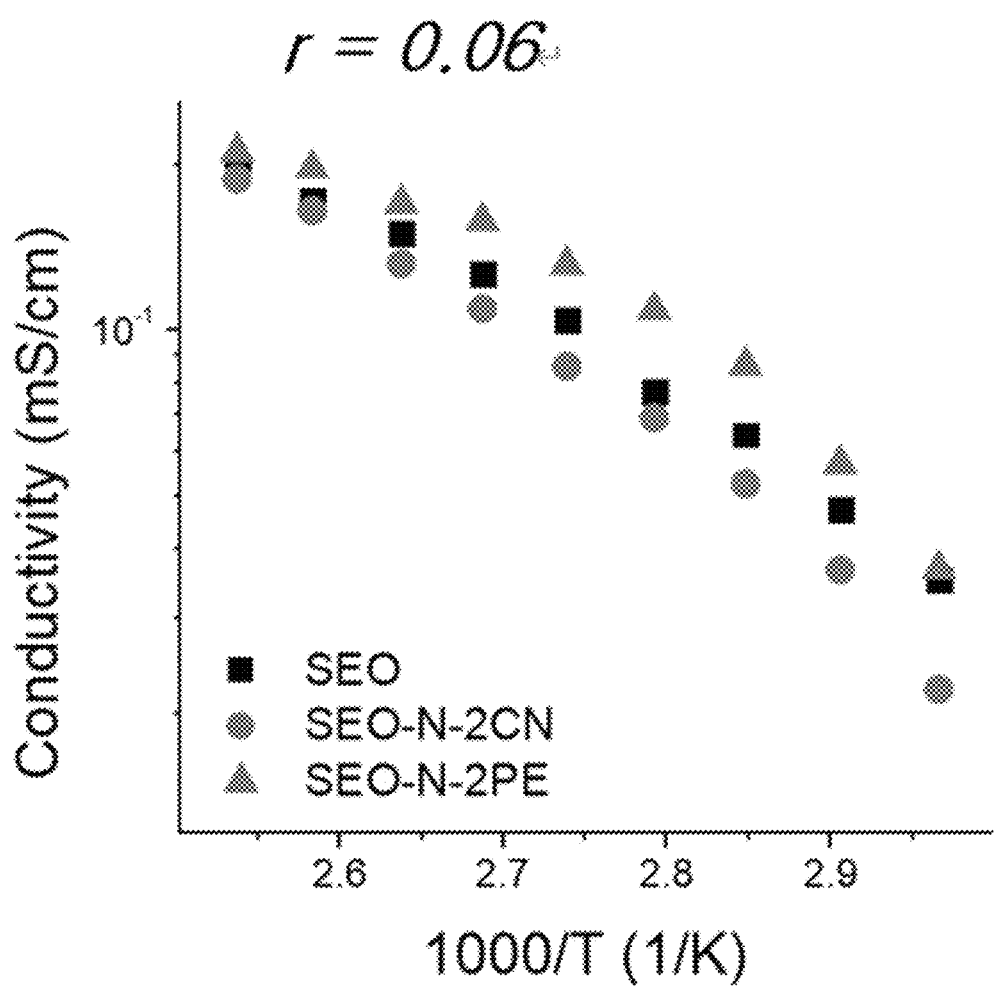

[Figure 10]
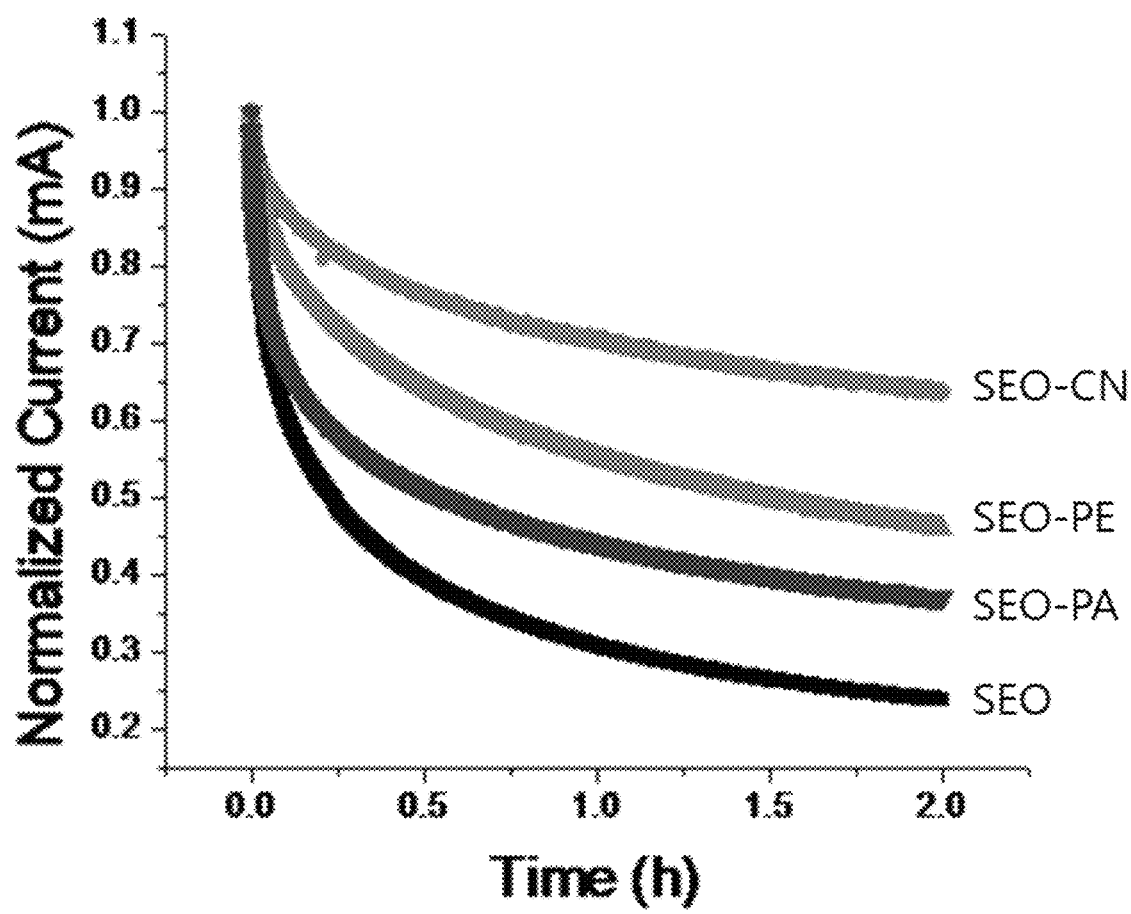

[Figure 11]
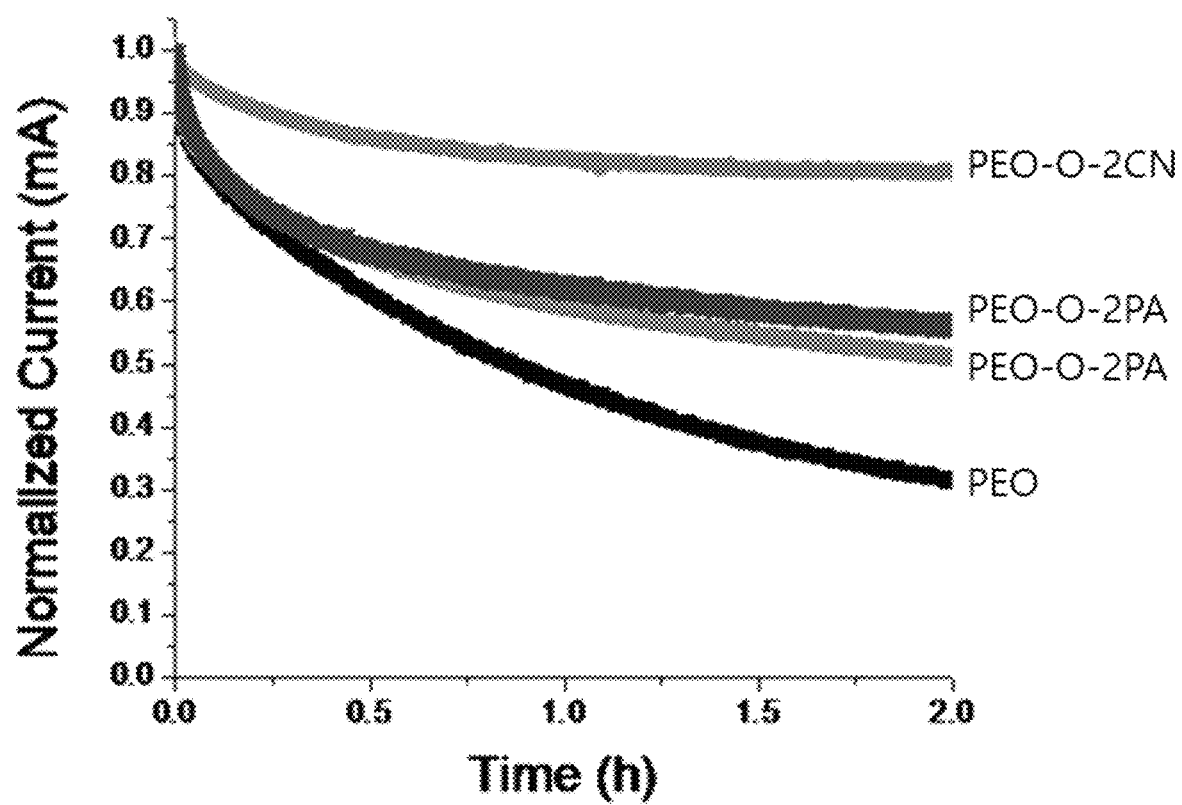

[Figure 12]
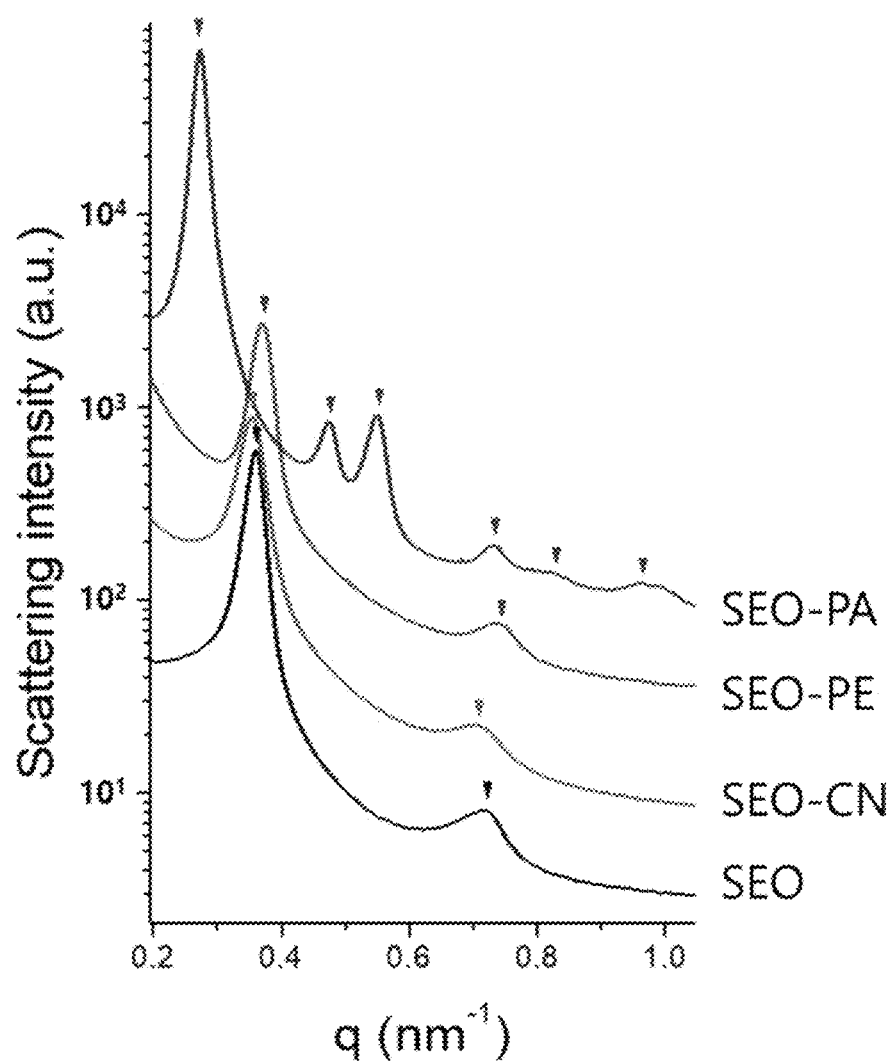

[Figure 13]
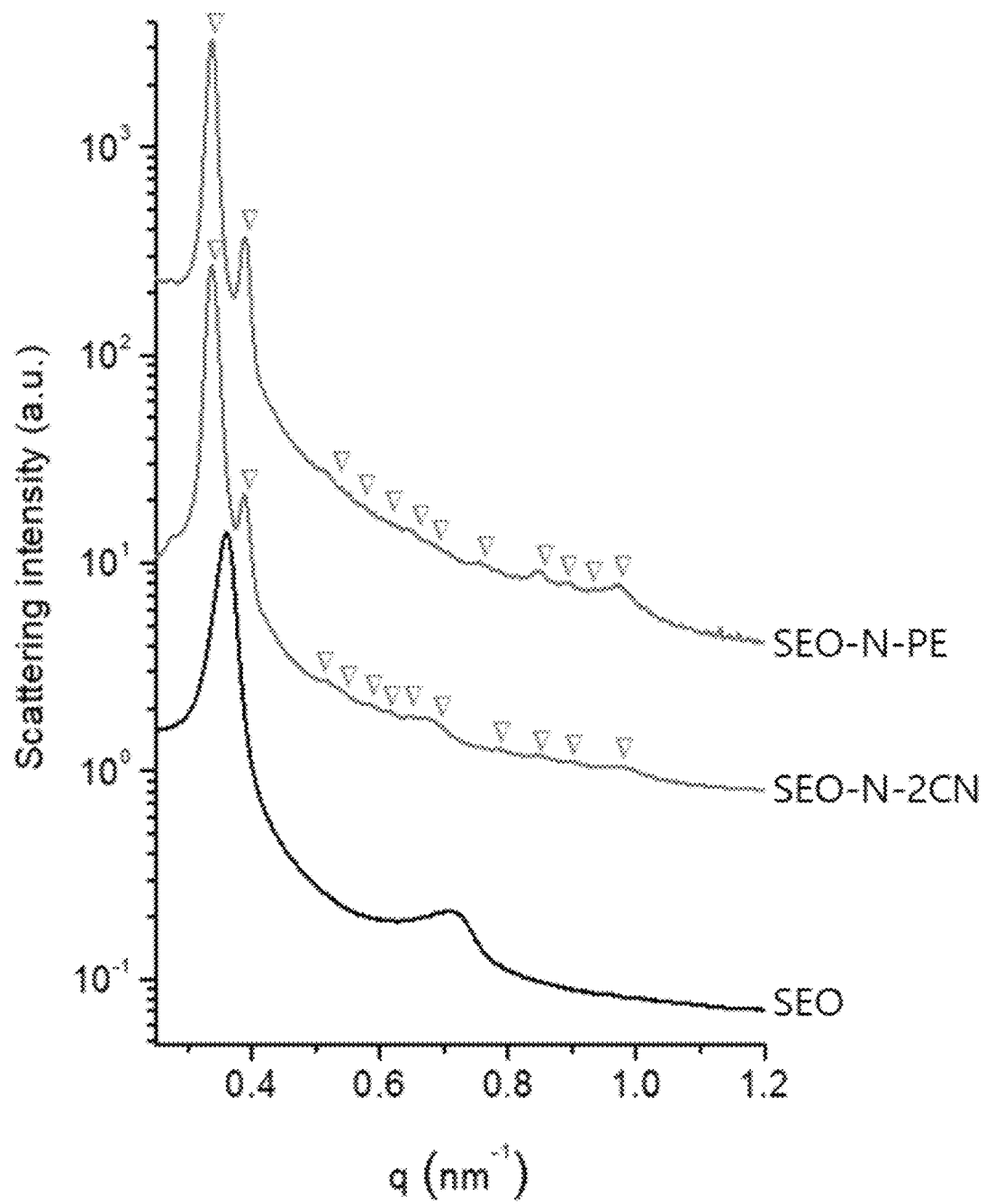

POLYMER ELECTROLYTE AND METHOD FOR PRODUCING SAME

TECHNICAL FIELD

The present application claims the benefit of priority based on Korean Patent Application No. 10-2018-0086287 filed on Jul. 25, 2018, the entire disclosure of which are incorporated herein by reference its entirety.

The present invention relates to a polymer electrolyte and a method for preparing the same, and more particularly, to a polymer electrolyte having an improved lithium cation transference number.

BACKGROUND ART

As the application field of secondary battery, which can be charged/discharged, from portable devices such as mobile phones, notebooks, and camcorders to electric vehicles is expanding day by day, secondary batteries are being actively developed. In addition, the research and development of battery design to improve capacity density and specific energy in the development of secondary battery are also under way.

Generally, it is known that the safety of the battery is increased in the order of liquid electrolyte<gel polymer electrolyte<solid electrolyte, while the battery performance is reduced.

A liquid state electrolyte, in particular, an ion conductive organic liquid electrolyte in which a salt is dissolved in a non-aqueous organic solvent has been mainly used as an electrolyte for an electrochemical device such as a battery using a conventional electrochemical reaction and an electric double layer capacitor. However, if such a liquid state electrolyte is used, there is a great possibility that the electrode material is degraded and the organic solvent is volatilized and also there is a problem in safety such as combustion due to ambient temperature and temperature rise of the battery itself.

In particular, the electrolyte used in the lithium secondary battery is in a liquid state and has the risk of flammability in high temperature environments, which can be a significant burden on the application to electric vehicles. In addition, since the organic electrolyte solution whose solvent is flammable is used, problems of ignition and burning in addition to leakage are always accompanied. For this reason, it has been studied to use an electrolyte having a flame retarding ionic liquid or gel phase, or an electrolyte having a polymer phase as an electrolyte solution. Accordingly, replacing a liquid state lithium electrolyte with a solid-state electrolyte can solve this problem. Therefore, various solid electrolytes have been researched and developed up to now.

The solid electrolyte is mainly made of flame retarding materials and thus have high stability and is stable at high temperature because it is composed of nonvolatile materials. In addition, since a solid electrolyte serves as a separator, a conventional separator is not necessary and there is a possibility of a thin film process.

The most ideal form is an all-solid-state form that uses inorganic solids even in the electrolyte, from which a secondary battery with excellent safety as well as excellent stability or reliability is obtained. In order to obtain a large capacity (energy density), it is also possible to adopt the form of a laminated structure. In addition, it is unnecessary to de-solvate the solvated lithium as in the conventional electrolytic solution, and since only lithium ions need to move through the ion conductor solid electrolyte and thus unnecessary side reactions do not occur, the cycle lifetime can be greatly extended.

With regard to the ion conductivity of the solid electrolyte, which is the biggest problem to be solved in realizing an all-solid-state secondary battery, previously, such conductivity has not been far below that of the organic electrolyte solution, but recently, a variety of techniques for improving ion conductivity have been reported, and studies on the practical use of an all-solid-state secondary battery using the same have been continued.

The composite electrolyte of polyethylene oxide (PEO) and lithium salt, which is one of the electrolytes used in such lithium ion batteries, has the advantage of having higher stability than the conventional liquid electrolyte.

However, PEO used in this electrolyte is a polymer with high crystallinity and thus when crystallized below the melting point of the polymer (about 50° C.), has a problem of extremely low ion conductivity. In the past, the polymer having a liquid state at room temperature by extremely decreasing the molecular weight of PEO was frequently used, but it is hard to say that this is a fundamental study that reduces the crystallization characteristics of PEO.

PRIOR ART DOCUMENT

Non-Patent Document (Non-Patent Document 1) Ito, K.; Nishina, N.; Ohno, H. J. Mater. Chem. 1997, 7, 1357-1362.

(Non-Patent Document 2) Jo, G.; Anh, H.; Park, M. J. ACS Macro Lett. 2013, 2, 990-995.

DISCLOSURE

Technical Problem

As described above, if PEO is used in electrolyte, when crystallized at about 50° C. or lower due to the low melting point of the polymer, there arises a problem that the ion conductivity can be extremely lowered. Accordingly, as a result of various studies, the inventors of the present invention have found a way to solve the problem by synthesizing a new polymer capable of reducing the intrinsic crystallinity of the PEO chain, and thus completed the present invention.

Therefore, it is an object of the present invention to provide an electrolyte for a lithium battery wherein the electrolyte is a PEO-based polymer electrolyte comprising a lithium salt, which has excellent ion conductivity at room temperature and has also been improved in transference number of lithium cations through a polymer to which one or more new functional groups are introduced.

Technical Solution

In order to achieve the above object, the present invention provides a polymer electrolyte comprising a polymer comprising an ethylene oxide unit; and a lithium salt, wherein a terminal of the polymer is substituted with one to four functional groups independently selected from the group consisting of nitrogen compound functional group and phosphorus compound functional group, and the terminal of the polymer and the one to four functional groups are linked by one selected from the group consisting of a C2 to C20 alkylene linker, a C2 to C20 ether linker and a C2 to C20 amine linker.

In addition, the present invention provides a method for preparing the polymer electrolyte comprising the steps of (a) modifying a terminal of a polymer comprising an ethylene oxide unit by adding a nitrogen compound or phosphorus compound to the polymer; and (b) adding a lithium salt.

In addition, the present invention provides an all-solid-state battery comprising a positive electrode, a negative electrode, and a solid polymer electrolyte interposed therebetween, wherein the solid polymer electrolyte is the polymer electrolyte of the present invention.

Advantageous Effects

If the polymer electrolyte of the present invention is applied to an all-solid-state battery, it is possible to reduce the crystallinity of the polymer through the synthesis of a polymer incorporating one to four various terminal functional groups without changing the molecular weight of the polymer comprising the ethylene oxide unit, and thus the polymer electrolyte of the present invention may have excellent ion conductivity even at room temperature. In addition, by controlling the molecular attraction between the terminal functional group and the lithium salt, it is possible to improve the lithium cation transference number, and thus there is an effect of improving the discharging capacity and the charging/discharging rate.

DESCRIPTION OF DRAWINGS

FIG. 1 is a graph showing the results of NMR data measurements of Examples 1 to 3 of the present invention and Comparative Example 1.

FIG. 2 is a graph showing the results of NMR data measurements of Examples 4 to 6 of the present invention and Comparative Example 2.

FIG. 3 is a graph showing the results of NMR data measurements of Examples 7 and 8 of the present invention and Comparative Examples 2 and 3.

FIG. 4 is a graph showing the results of the differential scanning calorimeter (DSC) analysis of Examples 1 to 3 of the present invention and Comparative Example 1.

FIG. 5 is a graph showing the results of the differential scanning calorimeter (DSC) analysis of Examples 4 to 8 of the present invention and Comparative Example 2.

FIG. 6 is a graph showing the results of the ion conductivity analysis of Examples 1 to 3 of the present invention and Comparative Example 1 when the value of [Li$^+$]/[EO] is 0.02 (r=0.02).

FIG. 7 is a graph showing the results of the ion conductivity analysis of Examples 1 to 3 of the present invention and Comparative Example 1 when the value of [Li$^+$]/[EO] is 0.06 (r=0.06).

FIG. 8 is a graph showing the results of the ion conductivity analysis of Examples 4 to 8 of the present invention and Comparative Example 2 when the value of [Li$^-$]/[EO] is 0.02 (r=0.02).

FIG. 9 is a graph showing the results of the ion conductivity analysis of Examples 9 and 10 of the present invention and Comparative Example 1 when the value of [Li$^+$]/[EO] is 0.06 (r=0.06).

FIG. 10 is a graph showing results of electrode polarization measurement of Examples 1 to 3 of the present invention and Comparative Example 1.

FIG. 11 is a graph showing results of electrode polarization measurement of Examples 4 to 6 of the present invention and Comparative Example 2.

FIG. 12 is a graph showing results of small angle X-ray scattering (SAXS) measurement of Examples 1 to 3 of the present invention and Comparative Example 1.

FIG. 13 is a graph showing results of small angle X-ray scattering (SAXS) measurement of Examples 9 and 10 of the present invention and Comparative Example 1.

BEST MODE

Hereinafter, the present invention will be described in more detail.

Polymer Electrolyte

The present invention relates to a polymer electrolyte comprising a polymer comprising an ethylene oxide unit; and a lithium salt, wherein a terminal of the polymer is substituted with one to four functional groups independently selected from the group consisting of a nitrogen compound functional group and phosphorus compound functional group, and the terminal of the polymer and the nitrogen compound functional group or the phosphorus compound functional group are linked by one selected from the group consisting of a C2 to C20 alkylene linker, a C2 to C20 ether linker, and a C2 to C20 amine linker.

The polymer electrolyte of the present invention can improve ion conductivity property by introducing a nitrogen compound or phosphorus compound as a functional group to the terminal of the polymer comprising the ethylene oxide unit and thus inducing various interactions between the functional group introduced into polymer and the lithium salt.

In addition, a terminal of the polymer and the nitrogen compound functional group or the phosphorus compound functional group are connected by one selected from the group consisting of a C2 to C20 alkylene linker, a C2 to C20 ether linker, and a C2 to C20 amine linker. The C2 to C20 ether linker may have 1 to 4 oxygens, and 1 to 4 nitrogen compound functional groups or phosphorus compound functional groups may be substituted in the terminal of the polymer depending on the number of oxygens. In addition, the C2 to C20 amine linker may be substituted with a nitrogen compound functional group or a phosphorus compound functional group connected with an alkylene group, in two bonding sites remaining after connection with the ethylene oxide unit. Therefore, the polymer of the present invention may be substituted with one or more of the nitrogen compound functional groups or phosphorus compound functional groups and thus may exhibit more excellent ion conductivity.

A terminal of the polymer may be substituted with one to four, preferably one or two nitrogen compound functional groups or phosphorus compound functional groups.

In addition, the C2 to C20 alkylene linker, the C2 to C20 ether linker, and the C2 to C20 amine linker may be preferably a C2 to C8 alkylene linker, a C2 to C8 ether linker, and a C2 to C8 amine linker.

The polymer comprising the ethylene oxide unit may be at least one selected from the group consisting of poly (styrene-b-ethylene oxide) and polyethylene oxide, wherein the terminal of the polymer is substituted with the one to four functional groups.

In addition, the nitrogen compound functional group may be nitrile, amine, pyridine, or imidazole, and the phosphorus compound functional group may be diethyl phosphonate or phosphonic acid.

Therefore, the polymer comprising the ethylene oxide unit of the present invention may be one or more selected from the group consisting of Formulas 1 to 10 below.

[Formula 1]
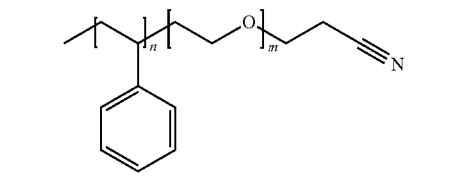

[Formula 2]
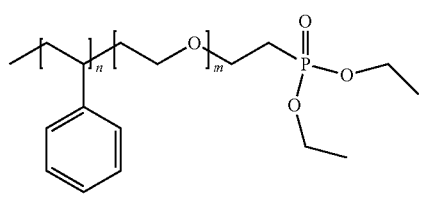

[Formula 3]
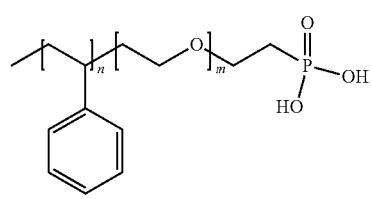

[Formula 4]
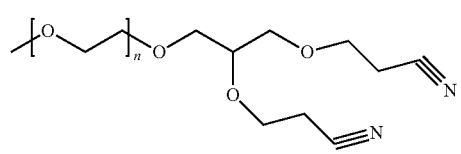

[Formula 5]
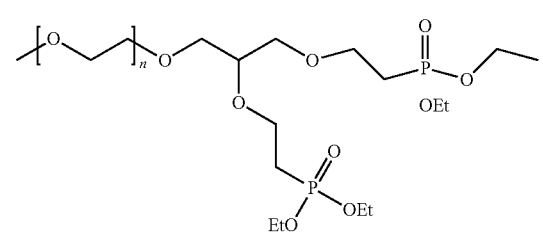

[Formula 6]
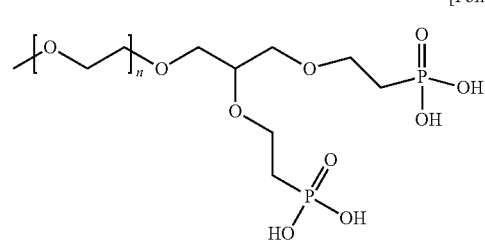

[Formula 7]
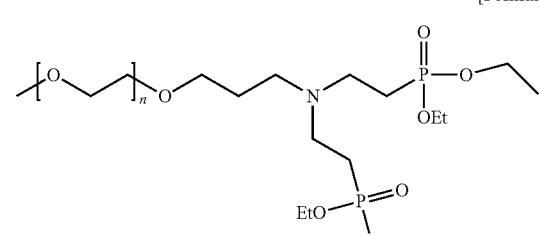

[Formula 8]
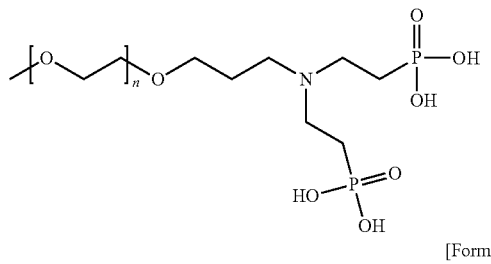

[Formula 9]
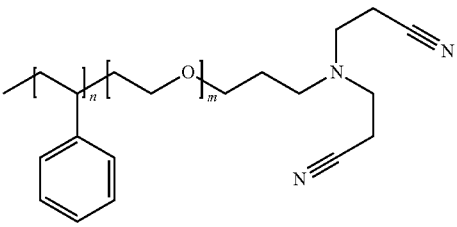

[Formula 10]
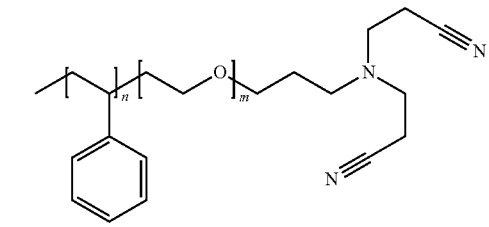

wherein $1 \leq n \leq 200$, and $1 \leq m \leq 200$.

Through the synthesis of a polymer to which one to four various terminal functional groups connected to the alkylene linker, the ether linker, or the amine linker are introduced, without changing the molecular weight of the polymer comprising the ethylene oxide unit as described above, the polymer electrolyte of the present invention can reduce the crystallinity of the polymer by about 20 to 80% as compared to the unsubstituted polyethylene oxide (PEO), and thus can improve the ion conductivity.

In addition, Formulas 9 and 10 have a gyroid structure, and the gyroid structure has a domain, in which each monomer is three-dimensionally linked, and thus can realize high mechanical strength and ion conductivity at the same time.

In addition, the polymer electrolyte of the present invention can be used as a solid electrolyte for an all-solid-state battery.

The solid electrolyte is mainly made of flame retarding materials and is stable at high temperature because it is made of nonvolatile material with high stability. In addition, since a solid electrolyte acts as a separator, a conventional separator is not necessary and a thin film process is possible.

The most ideal form is an all-solid-state form that uses inorganic solids in the electrolyte, from which a secondary battery having excellent stability and reliability as well as excellent safety can be obtained. In order to obtain a large capacity (energy density), it is also possible to adopt the form of a laminated structure. In addition, it is unnecessary to de-solvate the solvated lithium as in the conventional electrolyte solution, and since only lithium ions need to move through the ion conductor solid electrolyte and thus unnecessary side reactions do not occur, the cycle life can be greatly extended.

In addition, the polymer electrolyte of the present invention is preferable for application to an all-solid-state ion battery because its ion conductivity is improved as described later.

In addition, the present invention intends to improve ion conductivity and lithium cation transference characteristics by introducing a lithium salt into the polymer to prepare a composite electrolyte as described above.

To this end, the present invention dopes the polymer comprising the ethylene oxide unit with a lithium salt.

The lithium salt is not particularly limited, but preferably, may be at least one selected from the group consisting of LiTFSI, LiFSI, LiPF$_6$, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiPF$_6$, LiAlCl$_4$, CH$_3$SO$_3$Li, CF$_3$SO$_3$Li, chloroborane lithium, and lithium 4-phenylborate.

Since the polymer electrolyte of the present invention can reduce the crystallinity of the polymer by synthesizing the polymer having one to four various terminal functional groups connected to the alkylene group, the ether group, or the amine group without changing the molecular weight of the polymer comprising the ethylene oxide unit, the molecular weight of the polymer electrolyte can be 1 to 20 kg/mol.

Also, in the polymer electrolyte of the present invention, [Li$^+$]/[EO] value, which is a ratio of [EO] in the polymer and [Li$^+$] of the lithium salt, may be between 0.02 and 0.08 in order to ensure practical performance of the lithium battery. If the concentration of [EO] in the polymer and [Li$^+$] of the lithium salt is within the above range, since the electrolyte has appropriate conductivity and viscosity, excellent electrolyte performance can be obtained and lithium ions can be effectively transferred.

The [EO] of the polymer refers to the ethylene oxide unit.

In addition, the ion transference characteristics of the polymer electrolyte of the present invention may be 10$^{-5}$ to 10$^{-3}$ S/cm.

Preparation Method of Polymer Electrolyte

Also, in order to prepare the polymer electrolyte as described above, the present invention provides a method of preparing the polymer electrolyte comprising the steps of (a) modifying a terminal of a polymer comprising an ethylene oxide unit by adding a nitrogen compound or phosphorus compound to the polymer; and (b) adding a lithium salt.

In step (a), the terminal of the polymer can be modified by adding the nitrogen compound or phosphorus compound to the polymer comprising the ethylene oxide unit, so that the terminal of the polymer can be substituted with the nitrogen compound or the phosphorus compound functional group.

The polymer electrolyte of the present invention can improve the ion conductivity property by introducing the nitrogen compound or phosphorus compound as a functional group into the terminal of the polymer comprising the ethylene oxide unit and thus inducing various interactions between the functional group introduced into the polymer and the lithium salt.

The polymer comprising the ethylene oxide unit may be at least one selected from the group consisting of poly(styrene-b-ethylene oxide) and polyethylene oxide.

The nitrogen compound or phosphorus compound may be added in a manner commonly used in the art without particular limitation.

Specifically, the nitrogen compound functional group may be nitrile, amine, pyridine, or imidazole, and the phosphorus compound functional group may be diethyl phosphonate or phosphonic acid.

In addition, before the nitrogen compound or phosphorus compound is added to the polymer in step (a), the method may further comprise modifying the terminal of the polymer comprising the ethylene oxide unit with a hydroxyl group or amine group.

The polymer whose terminal is modified in step (a) may be one or more selected from the group consisting of Formulas 1 to 10 below.

[Formula 1]

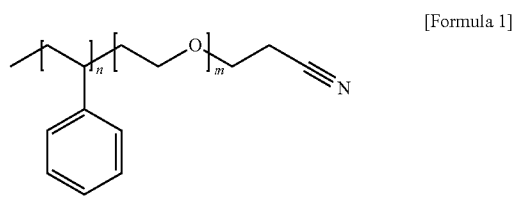

[Formula 2]

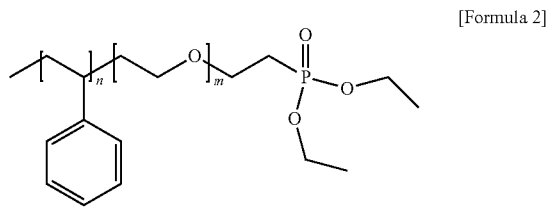

[Formula 3]

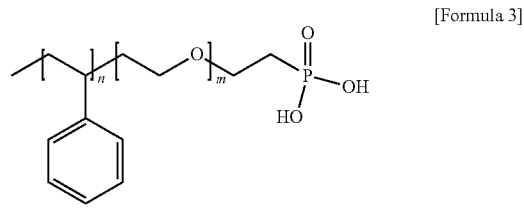

[Formula 4]

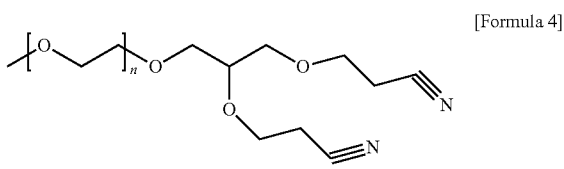

[Formula 5]

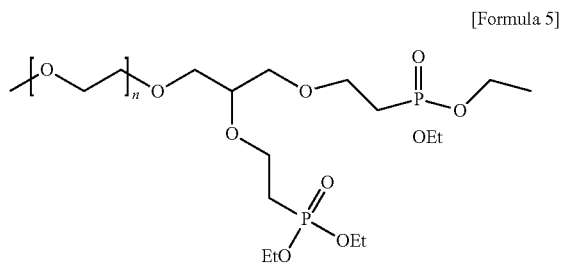

[Formula 6]

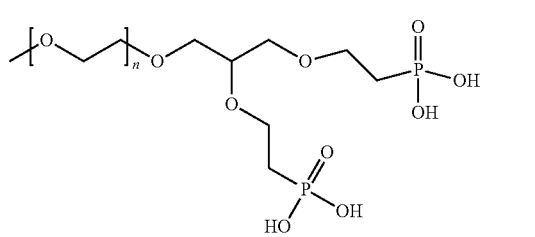

[Formula 7]

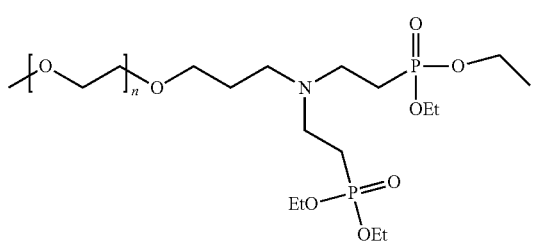

[Formula 8]

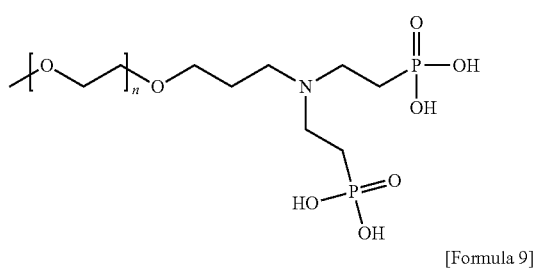

[Formula 9]

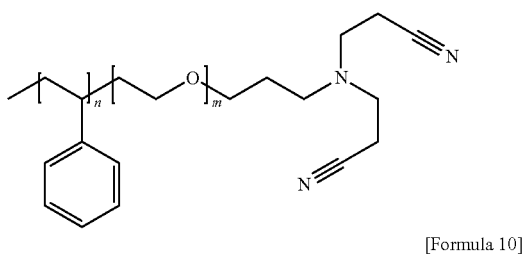

[Formula 10]

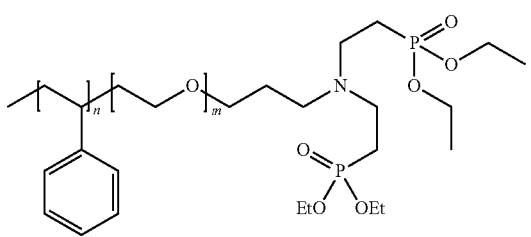

wherein 1≤n≤200, and 1≤m≤200.

The molecular weight of the polymer whose terminal is modified in step (a) may be 1 to 20 kg/mol.

If the terminal of the polymer is modified by adding the nitrogen compound functional group or a phosphorus compound functional group without adding a step of modifying with the hydroxyl group or the amine group, the polymers of Formulas 1 to 3 may be obtained.

Specifically, in the case of the polymers of Formulas 1 to 3, the terminal of the poly(styrene-b-ethylene oxide) and the nitrogen compound functional group or the phosphorus compound functional group are connected by the alkylene group, and the polymers of Formulas 1 to 3 contain one nitrogen compound functional group or one phosphorous compound functional group.

If the step of modifying by the hydroxyl group or the amine group is added, and then the terminal of the polymer is modified by adding the nitrogen compound functional group or the phosphorus compound functional group, the polymers of Formulas 4 to 10 may be obtained.

Specifically, in the case of the polymers of Formula 4 to 10, the terminal of the polyethylene oxide and the nitrogen compound functional group or phosphorus compound functional group are connected by an ether group or an amine group, and the polymers of Formulas 4 to 10 contain two nitrogen compound functional groups or two phosphorus compound functional groups.

Therefore, through the synthesis of polymer to which one or two various terminal functional groups are introduced without changing the molecular weight of the polymer, the polymer electrolyte of the present invention can reduce the crystallinity of the polymer by about 20 to 80% as compared to the unsubstituted polymer comprising the ethylene oxide unit.

In addition, the present invention is to improve the ion conductivity and lithium cation transference characteristics by introducing the lithium salt into the polymer modified in the step (a) through the step of adding the lithium salt in step (b) to prepare a composite electrolyte.

To this end, in the present invention, the polymer prepared in step (a) may be doped with a lithium salt.

The type of lithium salt is the same as described above.

Also, in the polymer electrolyte of the present invention, $[Li^+]/[EO]$ value, which is a ratio of [EO] in the polymer and $[Li^+]$ of the lithium salt, may be between 0.02 and 0.08 in order to ensure practical performance of the lithium battery. If the concentration of [EO] in the polymer and $[Li^+]$ of the lithium salt is within the above range, since the electrolyte has appropriate conductivity and viscosity, excellent electrolyte performance can be obtained and lithium ions can be effectively transferred.

In addition, the ion transference characteristics of the polymer electrolyte may be $10^{-5}$ to $10^{-3}$ S/cm.

All-Solid-State Battery

In addition, the present invention relates to an all-solid-state battery comprising a positive electrode, a negative electrode, and a solid polymer electrolyte interposed therebetween, wherein the solid polymer electrolyte is the polymer electrolyte of the present invention described above.

In the present invention, if the electrode proposed in the present invention is a positive electrode, a positive electrode active material may be used as an electrode active material, and if the electrode is a negative electrode, a negative electrode active material can be used as an electrode active material. At this time, each electrode active material may be any active material which is applied to conventional electrodes, and is not particularly limited in the present invention.

The positive electrode active material may vary depending on the use of the lithium secondary battery, and the specific composition is a known material. For example, any one lithium transition metal oxide selected from the group consisting of lithium-phosphate-iron-based compound, lithium cobalt-based oxide, lithium manganese-based oxide, lithium copper oxide, lithium nickel-based oxide and lithium manganese composite oxide, and lithium-nickel-manganese-cobalt-based oxide may be mentioned. More specifically, among the lithium metal phosphates represented by $Li_{1+a}M(PO_{4-b})X_b$, those wherein M is at least one selected from the metals of Groups 2 to 12, X is at least one selected from the group consisting of F, S, and N, and preferably, $-0.5 \le a \le +0.5$ and $0 \le b \le 0.1$, are preferable.

In that case, the negative electrode active material may be one selected from the group consisting of lithium metal, a lithium alloy, a lithium metal composite oxide, a lithium-containing titanium composite oxide (LTO), and a combination thereof. At this time, the lithium alloy may be an alloy of lithium and at least one metal selected from Na, K, Rb, Cs, Fr, Be, Mg, Ca, Sr, Ba, Ra, Al, and Sn. Also, the lithium metal composite oxide is composed of lithium (Li) and an oxide (MeO$_x$) of any one metal (Me) selected from the group consisting of Si, Sn, Zn, Mg, Cd, Ce, Ni, and Fe, and may be, for example, Li$_x$Fe$_2$O$_3$ (0<x≤1) or Li$_x$WO$_2$ (0<x≤1).

At this time, if necessary, in addition to the active material, an electrically conductive material or a polymer electrolyte may be further added. Examples of the electrically conductive material comprise nickel powder, cobalt oxide, titanium oxide, carbon, and the like. Examples of the carbon comprise any one selected from the group consisting of Ketjen black, acetylene black, furnace black, graphite, carbon fiber and fullerene, or at least one of them.

The all-solid-state battery is manufactured by a dry compression process in which an electrode and a solid electrolyte are prepared in powder form, and then the resulting powders are put into a predetermined mold and then pressed, or is manufactured through a slurry coating process in which slurry composition including active material, solvent, and binder is prepared, coated, and dried. The manufacture of the all-solid-state battery having the above-described configuration is not particularly limited in the present invention, and can be performed by a known method.

For example, a cell is assembled by placing a solid electrolyte between a positive electrode and a negative electrode, followed by compression-molding them. After the assembled cell is installed in the exterior material, it is sealed by heat compression or the like. Laminate packs made of aluminum, stainless steel, or the like, or cylindrical or square metal containers are very suitable for the exterior material.

The method of coating the electrode slurry on the current collector may comprise a method of dispensing the electrode slurry on the current collector and uniformly dispersing the electrode slurry using a doctor blade or the like, and methods such as die casting, comma coating, and screen printing. In addition, the electrode slurry may be bonded to the current collector by pressing or lamination after molding on a separate substrate. In that case, the thickness of the coating to be finally coated can be adjusted by adjusting the concentration of the slurry solution, the number of coatings, and the like.

The drying process is a process for removing the solvent and moisture in the slurry for drying the slurry coated on the metal current collector, and may vary depending on the solvent used. For example, the drying process is carried out in a vacuum oven at 50 to 200° C. Examples of the drying method may comprise a drying method by warm air, hot air, or low-humidity air, a vacuum drying method, and a drying method by irradiation with (far)-infrared radiation or electron beam. The drying time is not particularly limited, but is usually in the range of 30 seconds to 24 hours.

After the drying process, a cooling process may be further included, and the cooling process may be a cooling process which slowly cool to room temperature so that a recrystallized structure of the binder is well formed.

In addition, if necessary, in order to increase the capacity density of the electrode and to increase the adhesion between the current collector and the active materials after the drying process, a rolling process in which the electrode is passed between two rolls heated at a high temperature and is compressed to a desired thickness can be performed. The rolling process is not particularly limited in the present invention, and a known rolling process is possible. For example, the rolling process is carried out by passing between rotating rolls or by using a flat press machine.

Hereinafter, the present invention will be described in detail with reference to examples. However, the examples according to the present invention can be modified into various other forms, and the scope of the present invention should not be construed as being limited to the examples described below. The examples of the present invention are provided to enable a person skilled in the art to more fully understand the present invention.

Example 1. Preparation of Poly(Styrene-b-Ethylene Oxide) Substituted with Nitrile (SEO-CN)

After stirring poly(styrene-b-ethylene oxide) (SEO, Mn=16495 g/mol, 2.0 g, 0.12 mmol) and acrylonitrile (40 mL) at 0° C. for 30 minutes, KOH (20 mg, 0.36 mmol) was added thereto. When the color of the reactant turned yellow, 10 mL of HCl was added to terminate the reaction. The obtained reactant was extracted using dichloromethane, and then a solvent was removed using a rotary evaporator to obtain a polymer. The polymer was purified using ether.

NMR data of the prepared material were measured and shown in SEO-CN of FIG. 1, and the SEO-CN has the structure of Formula 1.

$^1$H NMR (300 MHz, CDCl$_3$) δ ppm: 7.10-6.40 (n×5H, —CH$_2$CH(C$_6$H$_5$)) 3.99-3.43 (n×4H, —OCH$_2$CH$_2$O—), 2.59 (2H, —OCH$_2$CH$_2$CN), 2.21-1.20 (b, n×3H, CH$_2$CH(C$_6$H$_5$)).

Example 2. Preparation of Poly(Styrene-b-Ethylene Oxide) Substituted with Diethyl Phosphonate (SEO-PE)

In a 50 mL round bottom flask, diethylvinylphosphonate (2.5 mL, 16.3 mmol) and cesium carbonate (0.5 g, 1.5 mmol) were mixed under argon (Ar) atmosphere, stirred at 90° C. for 30 minutes, and then SEO (Mn=16495 g/mol, 2.0 g, 0.12 mmol) dissolved in 12 mL of acetonitrile was dropped. After reacting for 3 days, HCl was added to terminate the reaction.

NMR data of the prepared material were measured and shown in SEO-PE of FIG. 1, and the SEO-PE has the structure of Formula 2.

$^1$H NMR (300 MHz, CDCl$_3$) δ ppm: 7.10-6.40 (n×5H, —CH$_2$CH(C$_6$H$_5$)), 4.15 (4H, —P=O(OCH$_2$CH$_3$)$_2$), 3.99-3.43 (n×4H, —OCH$_2$CH$_2$O—), 2.26 (2H, —PCH$_2$CH$_2$O—), 2.21-1.20 (b, n×3H, CH$_2$CH(C$_6$H$_5$)), 1.33 (4H, —P=O(OCH$_2$CH$_3$)$_2$).

Example 3. Preparation of Poly(Styrene-b-Ethylene Oxide) Substituted with Phosphonic Acid (SEO-PA)

SEO (0.5 g, 0.03 mmol) having the terminal substituted with phosphonate was dissolved in 12 mL of chloroform and cooled to 0° C. Bromotrimethylsilane (0.1 mL, 0.75 mmol) was slowly dropped. After reacting at 40° C. for 15 hours, methanol was added to terminate the reaction.

NMR data of the prepared material were measured and shown in SEO-PA of FIG. 1, and the SEO-PA has the structure of Formula 3.

$^1$H NMR (300 MHz, CDCl$_3$) δ ppm: 7.10-6.40 (n×5H, —CH$_2$CH(C$_6$H$_5$)), 3.99-3.43 (n×4H, —OCH$_2$CH$_2$O—), 2.21-1.20 (b, n×3H, CH$_2$CH(C$_6$H$_5$)), 1.99 (2H, —PCH$_2$CH$_2$O—).

Example 4. Preparation of Polyethylene Oxide Substituted with Two Nitriles (PEO-O-2CN)

Poly(ethylene glycol) methyl ether (2.0 g, 0.96 mmol) having the terminal substituted with di-hydroxyl and acrylonitrile (20 mL) were stirred at 0° C. for 30 minutes, and then KOH (10 mg, 0.18 mmol) was added thereto. When the color of the reactant turned yellow, 5 mL of HCl was added to terminate the reaction. The obtained reactant was extracted using dichloromethane, and then a solvent was removed using a rotary evaporator. The polymer obtained was purified using ether.

NMR data of the prepared material were measured and shown in PEO-O-2CN of FIG. 2, and the PEO-O-2CN has the structure of Formula 4.

$^1$H NMR (300 MHz, CDCl$_3$) δ ppm: 3.99-3.43 (n×4H, —OCH$_2$CH$_2$O—), 3.37 (3H, —OCH$_3$), 2.59 (2H, —OCH$_2$CH$_2$CN).

Example 5. Preparation of Polyethylene Oxide Substituted with Two Diethyl Phosphonates (PEO-O-2PE)

In a 50 mL round bottom flask, diethylvinylphosphonate (2.5 mL, 16.3 mmol) and cesium carbonate (0.5 g, 1.5 mmol) were mixed under argon (Ar) atmosphere, stirred at 90° C. for 30 minutes, and then poly(ethylene glycol) methyl ether (2.0 g, 0.96 mmol) having the terminal substituted with di-hydroxyl which was dissolved in 12 mL of acetonitrile was dropped. After reacting for 3 days, HCl was added to terminate the reaction.

NMR data of the prepared material were measured and shown in PEO-O-2PE of FIG. 2, and the PEO-O-2PE has the structure of Formula 5.

$^1$H NMR (300 MHz, D$_2$O) δ ppm: 4.15 (4H, —P═O(OCH$_2$CH$_3$)$_2$), 3.99-3.43 (n×4H, —OCH$_2$CH$_2$O—), 3.37 (3H, —OCH$_3$), 2.26 (2H, —PCH$_2$CH$_2$O—), 1.33 (4H, —P═O(OCH$_2$CH$_3$)$_2$).

Example 6. Preparation of Polyethylene Oxide Substituted with Two Phosphonic Acids (PEO-O-2PA)

Poly(ethylene glycol) methyl ether (1.0 g, 0.4 mmol) substituted with di-phosphonate was dissolved in 25 mL of chloroform and cooled to 0° C. Bromotrimethylsilane (0.1 mL, 0.75 mmol) was slowly dropped. After reacting at 40° C. for 15 hours, methanol was added to terminate the reaction.

NMR data of the prepared material were measured and shown in PEO-O-2PA of FIG. 2, and the PEO-O-2PA has the structure of Formula 6.

$^1$H NMR (300 MHz, D$_2$O) δ ppm: 3.99-3.43 (n×4H, —OCH$_2$CH$_2$O—), 3.37 (3H, —OCH$_3$), 1.99 (2H, —PCH$_2$CH$_2$O—).

Example 7. Preparation of Polyethylene Oxide Substituted with Two Diethyl Phosphonates (PEO-N-2PE)

Poly(ethylene glycol) methyl ether (0.5 g, 0.24 mmol) having the terminal substituted with amine, and diethylvinylphosphonate (0.3 mL, 4 mmol) were dissolved in distilled water (10 mL) and then reacted at 60° C. for 24 hours. The obtained reactant was extracted using dichloromethane, and then the solvent was removed using a rotary evaporator. The polymer obtained was purified using ether.

NMR data of the prepared material were measured and shown in PEO-N-2PE of FIG. 3, and the PEO-N-2PE has the structure of Formula 7.

$^1$H NMR (300 MHz, D$_2$O) δ ppm: 4.15 (4H, —P═O(OCH$_2$CH$_3$)$_2$), 3.99-3.43 (n×4H, —OCH$_2$CH$_2$O—), 3.37 (3H, —OCH$_3$), 2.82 (2H, —NCH$_2$CH$_2$—), 2.59 (2H, —CH$_2$CH$_2$N—), 2.12 (2H, —NCH$_2$CH$_2$—), 1.77 (2H, —OCH$_2$CH$_2$CH$_2$—), 1.34 (4H, —P═O(OCH$_2$CH$_3$)$_2$).

Example 8. Preparation of Polyethylene Oxide Substituted with Two Phosphonic Acids (PEO-N-2PA)

Poly(ethylene glycol) methyl ether (1.0 g, 0.4 mmol) having the terminal substituted with di-phosphonate was dissolved in 25 mL of chloroform and cooled to 0° C. Bromotrimethylsilane (0.1 mL, 0.75 mmol) was slowly dropped. After reacting at 40° C. for 15 hours, methanol was added to terminate the reaction.

NMR data of the prepared material were measured and shown in PEO-N-2PA of FIG. 3, and the PEO-N-2PA has the structure of Formula 8.

$^1$H NMR (300 MHz, D$_2$O) δ ppm: 3.99-3.43 (n×4H, —OCH$_2$CH$_2$O—), 3.37 (3H, —OCH$_3$), 1.99 (2H, —PCH$_2$CH$_2$O—).

Example 9. Preparation of Poly(Styrene-b-Ethylene Oxide) Substituted with Two Nitriles (SEO-N-2CN)

SEO (0.3 g, 0.018 mmol) having the terminal substituted with amine and acrylonitrile (0.5 mL, 7.6 mmol) were completely dissolved in 15 mL of THF, and then 15 mL of distilled water was added thereto. The reaction was allowed to proceed at 60° C. for 24 hours. The solvent was removed from the obtained reactant using a rotary evaporator, and the product was purified by precipitation using ether.

NMR data of the prepared material were measured. SEO-N-2CN which is the material prepared has the structure of Formula 9.

$^1$H NMR (300 MHz, CDCl$_3$) δ ppm: 7.10-6.40 (n×5H, —CH$_2$CH(C$_6$H$_5$)), 3.99-3.43 (n×4H, —OCH$_2$CH$_2$O—), 3.01 (2H, —NCH$_2$CH$_2$—), 2.73 (2H, —NCH$_2$CH$_2$—), 2.59 (2H, —CH$_2$CH$_2$N—), 2.21-1.20 (b, n×3H, —CH$_2$CH(C$_6$H$_5$)).

Example 10. Preparation of Poly(Styrene-b-Ethylene Oxide) Substituted with Diethyl Phosphonates (SEO-N-2PE)

SEO (0.3 g, 0.018 mmol) having the terminal substituted with amine and diethylvinylphosphonate (0.5 mL, 6.7 mmol) were completely dissolved in 15 mL of THF, and then 15 mL of distilled water was added thereto. The reaction was allowed to proceed at 60° C. for 24 hours. The solvent was removed from the obtained reactant using a rotary evaporator, and the product was purified by precipitation using ether.

NMR data of the prepared material were measured. SEO-N-2PE which is the material prepared has the structure of Formula 10.

$^1$H NMR (300 MHz, CDCl$_3$) δ ppm: 7.10-6.40 (n×5H, —CH$_2$CH(C$_6$H$_5$)), 4.15 (4H, —P═O(OCH$_2$CH$_3$)$_2$), 3.99-3.43 (n×4H, —OCH$_2$CH$_2$O—), 2.82 (2H, —NCH$_2$CH$_2$—), 2.59 (2H, —CH$_2$CH$_2$N—), 2.21-1.20 (b, n×3H, —CH$_2$CH(C$_6$H$_5$)), 2.12 (2H, —NCH$_2$CH$_2$—), 1.77 (2H, —OCH$_2$CH$_2$CH$_2$—), 1.34 (4H, —P═O(OCH$_2$CH$_3$)$_2$).

Comparative Example 1. Preparation of Poly(Styrene-b-Ethylene Oxide) (SEO)

Benzene to be used as a solvent was purified by stirring it in CaH$_2$ for one day and in sec-butyllithium for one day.

Styrene monomer was purified in CaH$_2$ for one day and in di-n-butylmagnesium for one day, and ethylene oxide monomer was purified by repeatedly stirring it twice in CaH$_2$ for one day and in n-butyllithium for 30 minutes. Sec-BuLi (0.9 mL, 1.26 mmol) was added to 200 mL of purified benzene, followed by degassing to a vacuum state. After distilling the purified styrene (8.8 mL, 77 mmol) into it, the reaction was allowed to proceed at 40° C. for 4 hours. After 1 mL of purified ethylene oxide was added and terminal-capped, the solution was transferred to a glove box and t-Bu-P4 (1.5 mL, 1.5 mmol) was added, followed by degassing to a vacuum state. After distilling the purified ethylene oxide (9 mL, 182 mmol) into it, the reaction was allowed to proceed at 40° C. for 3 days. The reaction was terminated by adding 10 mL of MeOH. After completion of the reaction, purification was performed by precipitation using ether.

NMR data of the prepared material was measured and the result is shown in SEO of FIG. 1.

$^1$H NMR (300 MHz, D$_2$O) δ ppm: 7.10-6.40 (n×5H, —CH$_2$CH(C$_6$H$_5$)) 3.99-3.43 (n×4H, —OCH$_2$CH$_2$O—), 2.21-1.20 (b, n×3H, CH$_2$CH(C$_6$H$_5$)).

Comparative Example 2. Preparation of Polyethylene Oxide (PEO)

Ethylene oxide monomer was purified by repeatedly stirring it twice in CaH$_2$ for one day and in n-butyllithium for 30 minutes. Methanol was purified using magnesium and THF to be used as a solvent was purified using benzophenone ketyl. Methanol (0.04 mL, 1 mmol) and t-Bu-P4 (1 mL, 1 mmol) were added to 100 mL of purified THF, followed by degassing to a vacuum state. After distilling the purified ethylene oxide (5 mL, 100 mmol) into it, the reaction was allowed to proceed at room temperature for 3 days. The reaction was terminated by adding 0.1 mL of acetic acid. After completion of the reaction, purification was performed using hexane.

NMR data of the prepared material was measured and the results are shown in PEO of FIGS. 2 and 3.

$^1$H NMR (300 MHz, D$_2$O) δ ppm: 3.99-3.43 (n×4H, —OCH$_2$CH$_2$O—), 3.37 (3H, —OCH$_3$), 1.99.

Comparative Example 3. Preparation of Polyethylene Oxide Substituted with Amino Group (PEO-NH$_2$)

Borane-THF complex (5 mL, 1 M in THF, 5 mmol) was mixed with anhydrous THF (15 mL) and lowered to 0° C. Poly(ethylene glycol) methyl ether (2.0 g, 0.97 mmol) having the terminal substituted with nitrile was dissolved in anhydrous THF (10 mL) and then the solution obtained was added dropwise to the above mixture. The reaction was allowed to proceed by reflexing for 4 hours under argon (Ar) atmosphere. The temperature was lowered to 0° C. and MeOH (5 mL) was added. HCl (0.25 mL) was added slowly, followed by reacting for 1 hour. The obtained reactant was extracted with dichloromethane and the solvent was removed using a rotary evaporator. The obtained polymer was purified using ether.

NMR data of the prepared material was measured and the results are shown in PEO-NH$_2$ of FIG. 3.

$^1$H NMR (300 MHz, CDCl$_3$) δ ppm: 3.99-3.43 (n×4H, —OCH$_2$CH$_2$O—), 3.37 (3H, —OCH$_3$), 2.59 (2H, —OCH$_2$CH$_2$CN).

Experimental Example 1. Result of NMR Measurement (1) Examples 1 to 3

The substitution ratio of the terminals of the polymers prepared in Examples 1 to 3 was confirmed by $^1$H NMR. It can be seen that in the case of the SEO-CN polymer of Example 1 to which the nitrile functional group was introduced, high substitution ratio of 99% or more were shown, and also in the case of the SEO-PE polymer of Example 2 to which the diethylphosphonate functional group was introduced, high substitution ratio of 77% or more was shown. In addition, in the case of SEO-PA of Example 3 having a phosphonic acid functional group synthesized by hydrolyzing the SEO-PE of Example 2, the hydrolysis ratio was 100%. Additionally, it was confirmed by $^{31}$P NMR that the hydrolysis ratio of SEO-PA in Example 3 was 100% and that no side reactions also occurred.

(2) Examples 4 to 6

The substitution ratio of the terminals of the polymers prepared in Examples 4 to 6 in which the terminal of PEO and two functional groups are connected by an ether group was confirmed by $^1$H NMR. In the case of PEO-O-2CN polymer of Example 4 having two nitrile functional groups introduced, the substitution ratio of about 62% was shown, and in the case of PEO-O-2PE of Example 5 having two diethylphosphonate functional groups introduced, substitution ratio of about 52% was shown. In addition, PEO-O-2PE of Example 5 was hydrolyzed to synthesize PEO-O-2PA of Example 6, and it was further confirmed by $^{31}$P NMR that the hydrolysis proceeded 100%.

(3) Examples 7 and 8

The substitution ratio of the terminals of the polymers prepared in Examples 7 and 8 in which the terminal of PEO and two functional groups are connected by an amine group was confirmed by $^1$H NMR. In the case of PEO-N-2PE of Example 7 having two diethylphosphonate functional groups introduced, substitution ratio of about 75% was shown. PEO-N-2PE of Example 7 was hydrolyzed to synthesize PEO-N-2PA of Example 8, and it was further confirmed by $^{31}$P NMR that the hydrolysis proceeded 100%.

Experimental Example 2. Result of DSC Measurement (Identification of the Effect of Functional Groups on the Crystallinity of the Polymer)

DSC thermograms of the polymers prepared in Examples 1 to 8 and Comparative Examples 1 and 2 were measured using TA Instruments (model Q20). About 5 mg of sample was placed in an aluminum pan in a glove box filled with argon and an empty aluminum pan was used as a reference. The thermodynamic properties between −65° C. and 120° C. were measured for a temperature rising/cooling rate of 10° C./min.

(1) Examples 1 to 3 and Comparative Example 1

The effect of the terminal functional group on the crystallinity was quantitatively analyzed by a differential scanning calorimeter (DSC), and the results are shown in Table 1 and FIG. 4.

TABLE 1

|  | $T_m$ (°C.) | $\Delta H_m$ (J/g) | $T_c$ (°C.) | $\Delta H_c$ (J/g) |
| --- | --- | --- | --- | --- |
| Comparative Example 1(SEO) | 53.7 | 52.48 | 25.8 | 49.2 |
| Example 1(SEO-CN) | 52.8 | 47.1 | 30.6 | 44.1 |
| Example 2(SEO-PE) | 48.1 | 34.3 | 23.4 | 33.7 |
| Example 3(SEO-PA) | 50 | 20.68 | 18.5 | 19.9 |

It can be seen that the polymer of Examples 1 to 3 having the functional group introduced at its terminal shows a lower heat of fusion ($\Delta H_m$) than the SEO of Comparative Example 1. If the crystallinity when the heat of fusion ($\Delta H_m$) of PEO is 215.6 J/g is calculated as 100%, the crystallinities of Comparative Example 1 (SEC)), Example 1 (SEO-CN), Example 2 (SEO-PE), and Example 3 (SEO-PA) were 49%, 44%, 32%, and 20%, respectively. Since the concentration of the functional group introduced at the terminal is less than 1 mol %, it is very interesting to show these decreases in crystallinity. In the case of PEO, the conductivity drops sharply due to crystallization below the melting point, resulting in very low room temperature conductivity. However, it can be seen that if a functional group is introduced at the terminal of the polymer comprising the ethylene oxide unit, the crystallinity can be significantly reduced as described above, thereby improving the conductivity characteristics at room temperature.

(2) Example 4 to 8 and Comparative Example 2

The effect of the terminal functional group on the crystallinity was quantitatively analyzed by a differential scanning calorimeter (DSC), and the results are shown in Table 2 and FIG. 5.

TABLE 2

|  | $T_m$ (°C.) | $\Delta H_m$ (J/g) | $T_c$ (°C.) | $\Delta H_c$ (J/g) |
| --- | --- | --- | --- | --- |
| Comparative Example 2(PEO) | 55.2 | 178.3 | 33.6 | 161.7 |
| Example 4(PEO-O-2CN) | 51 | 140.3 | 23.1 | 126.1 |
| Example 5(PEO-O-2PE) | 50.9 | 136 | 33.8 | 127.6 |
| Example 6(PEO-O-2PA) | 52.1 | 123.8 | 24.9 | 106.8 |
| Example 7(PEO-N-2PE) | 50.6 | 114.1 | 28.9 | 103.6 |
| Example 8(PEO-N-2PA) | 45.6 | 53.7 | 16.7 | 53.6 |

If the crystallinity when the heat of fusion ($\Delta H_m$) of PEO is 215.6 J/g is calculated as 100%, the crystallinities of Examples 4 to 6 (PEO-O-2CN, PEO-O-2PE, PEO-O-2PA) were 79%, 76%, and 69%, respectively. On the other hand, even though two functional groups were substituted at the terminal, different conductivity properties were shown depending on the linkers connecting the terminal of the polymer and functional group. The crystallinities of Examples 7 and 8 (PEO-N-2PE, PEO-N-2PA) were 64% and 30%, respectively. This indicates that the conductivity property can be affected differently depending on the types of linkers.

Experimental Example 3. Result of Ion Conductivity Measurement

After doping a lithium salt (LiTFSI) to the polymers prepared in Examples 1 to 8 and Comparative Examples 1 to 2, the ion conductivity was analyzed using Potentiostat (VersaSTAT 3, Princeton Applied Research).

Samples doped with the lithium salt were measured for through plane conductivity using potentiostat (VersaSTAT 3, Princeton Applied Research) in a glove box in an argon environment. Two electrode cells made in the laboratory (composed of a stainless steel blocking electrode and 1 cm×1 cm platinum working/counter electrode) were used, and the sample thickness was made to be 200 μm.

(1) Examples 1 to 3 and Comparative Example 1

The result obtained by doping 2% (r=0.02) lithium salt is shown in FIG. 6.

It can be clearly observed that the polymers of Example 1 (SEO-CN), Example 2 (SEO-PE), and Example 3 (SEO-PA) having the terminals substituted with functional groups have much improved conductivity near room temperature as compared to Comparative Example 1 (SEC)). In particular, it can be seen that Example 3 (SEO-PA), which had the lowest crystallinity, showed the highest room temperature conductivity.

The result obtained by doping 6% (r=0.06) lithium salt is shown in FIG. 7.

It was observed that as the temperature increases, the polymers of Example 1 (SEO-CN), Example 2 (SEO-PE), and Example 3 (SEO-PA) having the terminals substituted with functional groups exhibit slightly higher conductivity. This means that the terminal can affect the crystallinity, thereby not only improving the conductivity property at room temperature but also additionally improving the conductivity due to interaction with the lithium salt.

(2) Example 4 to 8 and Comparative Example 2

The result obtained by doping 2% (r=0.02) lithium salt is shown in FIG. 8.

It was observed that the polymers of Example 6 (PEO-O-2PA) and Example 8 (PEO-N-2PA) which have relatively low crystallinity are 40 and 20 times higher in conductivity at room temperature than Comparative Example 2 (PEO), respectively. In addition, even although the glass transition temperature ($T_g$) of the polymers of Examples 4 to 8 of the present invention which have two functional groups substituted in the terminal of the polymers is improved, the polymers of Example 4 (PEO-O-2CN) and Example 7 (PEO-N-2PE) show the increased ion conductivity efficiency over the entire temperature range.

(3) Examples 9 and 10 and Comparative Example 1

The result obtained by doping 6% (r=0.06) lithium salt is shown in FIG. 9.

Polymers of Example 9 (SEO-N-2CN) and Example 10 (SEO-N-2PE), which have relatively low crystallinity, have exhibited conductivity characteristics similar to or about 1.2 times higher than those of Comparative Example 1 (SEC)), even though the glass transition temperature ($T_g$) was improved by introducing a functional group at the terminal.

Experimental Example 4. Result of Measurement of Electrode Polarization

In order to analyze the effect of the interaction between the lithium salt and the terminal of the polymer functional group on ion diffusion in the electrolyte, the measurement of electrode polarization was performed.

(1) Examples 1 to 3 and Comparative Example 1

After doping 6% (r=0.06) lithium salt (LiTFSI) to the polymers prepared in Examples 1 to 3 and Comparative Example 1, the experiment of polarization was performed by placing them between two lithium electrodes. The temperature of the sample was set to 45° C., and the current flowing for 2 hours was observed while maintaining the polarization voltage (DV) at 0.1V. All procedures were performed in a glove box in an argon environment.

The results are shown in FIG. 10 and Table 3.

TABLE 3

|  | $I_\infty/I_0$ |
| --- | --- |
| Comparative Example 1(SEO) | 0.23 |
| Example 1(SEO-CN) | 0.64 |
| Example 2(SEO-PE) | 0.46 |
| Example 3(SEO-PA) | 0.37 |

It was confirmed that the terminal-substituted polymers of Examples 1 to 3 (SEO-CN, SEO-PE, SEO-PA) have higher final current values than Comparative Example 1 (SEC)). This is thought to be because it dissociates the lithium salt effectively and works favorably to diffuse lithium, even though the relaxation of the polymer was slowed down due to the functional group at the terminal of the polymer (raising $T_g$). In particular, the polymer of Example 1 (SEO-CN) substituted with nitrile functional group, which is well known to coordinate with lithium, showed the highest current retention of 0.64.

(2) Examples 4 to 6 and Comparative Example 2

After doping 6% (r=0.06) lithium salt (LiTFSI) to the polymers prepared in Examples 4 to 6 and Comparative Example 2, the experiment of polarization was performed by placing them between two lithium electrodes. The temperature of the sample was set to 30° C., and the current flowing for 2 hours was observed while maintaining the polarization voltage (DV) at 0.1V. All procedures were performed in a glove box in an argon environment.

The results are shown in FIG. 11 and Table 4.

TABLE 4

|  | $I_\infty/I_0$ |
| --- | --- |
| Comparative Example 2(PEO) | 0.32 |
| Example 4(PEO-O-2CN) | 0.81 |
| Example 5(PEO-O-2PE) | 0.51 |
| Example 6(PEO-O-2PA) | 0.57 |

It was confirmed that all the polymers of Examples 4 to (PEO-O-2CN, PEO-O-2PE, PEO-O-2PA), whose terminals are substituted with two functional groups, have higher final current values than Comparative Example 2 (PEO). In particular, it was found that in the case of Example 4 (PEG-O-2CN) having two substituted nitrile functional groups, the current retention was about 1.3 times higher than that of the conventional PEO-CN having one nitrile. This means that if the terminal of the polymer is substituted with multiple functional groups, the effect can be maximized.

Experimental Example 5. Analysis of Morphology

Small angle X-ray scattering (SAXS) of the polymers prepared in Example 1 to 3, 9, 10 and Comparative Example 1 was performed to analyze the morphology of the polymer.

Measurements were performed on Pohang Light Source (PLS) 4C and 9A beam lines. The wavelength I of the incident X-ray is 0.118 nm (DA/λ=10⁻⁴). In order to prevent the samples from absorbing oxygen and moisture during the measurement process, a closed cell was manufactured and used using a Kapton film. The distance from the sample to the detector was 2 m.

(1) Examples 1 to 3 and Comparative Example 1

Comparative Example 1 (SEO), Example 1 (SEO-CN), and Example 2 (SEO-PE) all showed Bragg peaks of 1q* and 2q*, indicating the formation of aligned lamellar structures. The domain spacing ($d_{100}$) for Comparative Example 1 (SEO), Example 1 (SEO-CN), and Example 2 (SEO-PE) showed nearly similar phase separation behaviors of 17.4 nm, 17.7 nm, and 17 nm, respectively.

On the other hand, Example 3 (SEO-PA) showed Bragg peaks of 1q*, √3q*, √4q*, √7q*, and √9q*, which means a hexagonal cylinder structure. It can be seen that domain spacing ($d_{100}$) is 23 nm, and despite the completely same substitution ratio as Example 2 (SEO-PE), the terminal phosphonic acid functional group causes a very large volume change. This phase transition is expected to be a result of the change in the crystallinity of the PEO. The density of crystallinity PEO is 1.21 g/cm³, whereas the density of amorphous PEO is 1.12 g/cm³. Therefore, it can be seen that in the case of Example 3 (SEO-PA), the free volume is increased due to the large decrease of crystallinity of 80%, showing the phase transition behavior (FIG. 12).

(2) Examples 9, 10 and Comparative Example 1

In the polymers of Example 9 (SEO-N-2CN) and Example 10 (SEO-N-2PE) in which poly(styrene-b-ethylene oxide) (SEO) and two terminal functional groups are linked by an amine group, a gyroid morphology was observed regardless of the type of the terminal functional group. The inverted triangles shown in FIG. 13 represent Bragg peaks of √6q*, √8q*, √14q*, √16q*, √20q*, √22q*, √24q*, √30q*, √32q*, √38q*, √42q*, √46q*, and √48q*, indicating very well aligned gyroid morphology (FIG. 13). Since the gyroid morphology has a domain in which each block is connected three-dimensionally, it has a structural advantage that can simultaneously achieve high mechanical strength and conductivity properties, but is known as a morphology that is difficult to implement because it is distributed in a very narrow area on the phase diagram. However, in the present invention, the above-described morphology could be implemented by a simple method of substituting the terminal with a functional group, and showed very high morphology reproducibility.

In addition, it can be seen that in the case of the gyroid morphology, since the morphology is a morphology that appears when the substitution ratio is 70% or more, the polymers of Examples 9 and 10 were substituted at 70% or more at the terminals through the analysis of morphology.

The invention claimed is:
1. A polymer electrolyte comprising:
a polymer comprising an ethylene oxide unit; and
a lithium salt,
wherein the polymer electrolyte is a solid electrolyte for an all-solid-state battery, and
wherein the polymer comprising the ethylene oxide unit is at least one selected from the group consisting of Formulas 5 to 8 below:

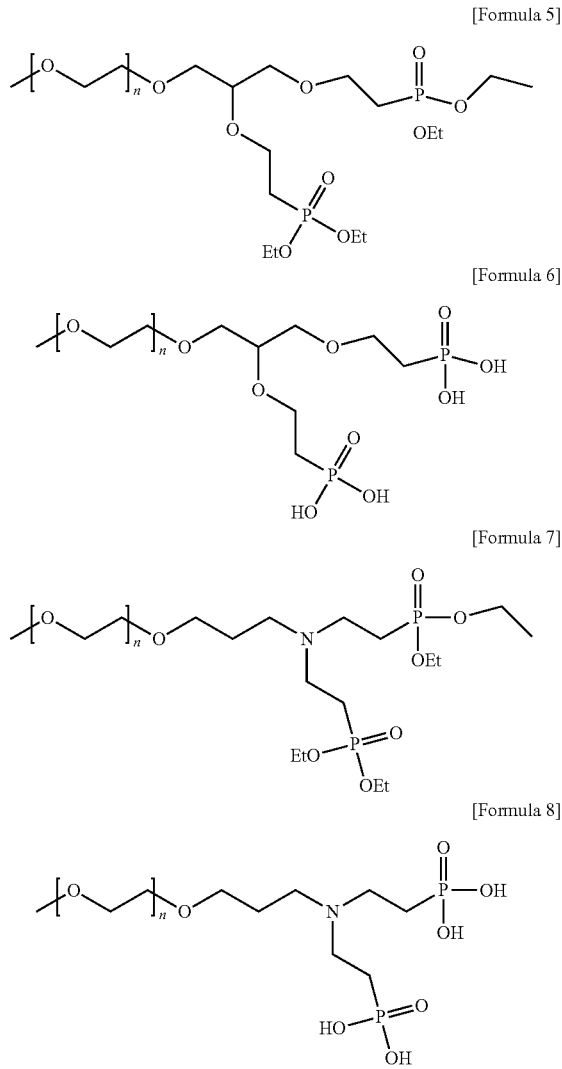

wherein 1≤n≤200.

2. The polymer electrolyte of claim 1, wherein the lithium salt is at least one selected from the group consisting of LiTFSI, LiFSI, LiPF$_6$, LiCl, LiBr, LiI, LiClO$_4$, LiBF$_4$, LiB$_{10}$Cl$_{10}$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, chloroborane lithium, and lithium 4-phenylborate.

3. The polymer electrolyte of claim 1, wherein a molecular weight of the polymer comprising the ethylene oxide unit is 1 kg/mol to 20 kg/mol.

4. The polymer electrolyte of claim 1, wherein in the polymer electrolyte, a [Li$^+$]/[EO] value, wherein EO represents ethylene oxide, which is a ratio of [EO] in the polymer and [Li$^+$] of the lithium salt, is between 0.02 and 0.08.

5. The polymer electrolyte of claim 1, wherein an ion transference characteristic of the polymer electrolyte is 10$^{-5}$ S/cm to 10$^{-3}$ S/cm.

6. A method for preparing a polymer electrolyte according to claim 1, comprising the steps of:
(a) modifying a terminal of a polymer comprising an ethylene oxide unit by adding a nitrogen compound or phosphorus compound to the polymer; and
(b) adding a lithium salt,
wherein the polymer electrolyte is a solid electrolyte for an all-solid-state battery, and
wherein the polymer comprising the ethylene oxide unit is at least one selected from the group consisting of Formulas 5 to 8 below:

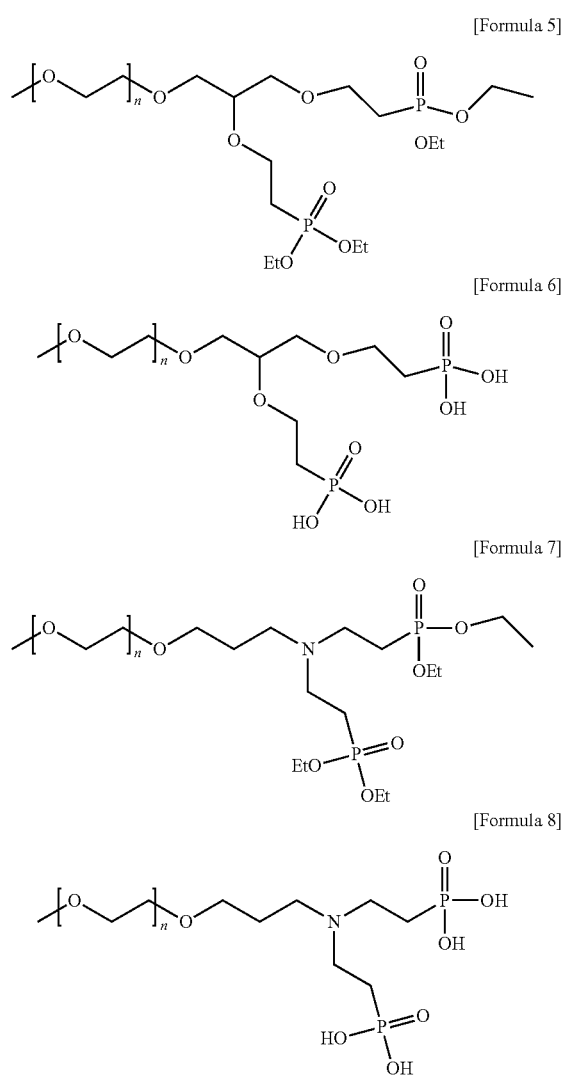

wherein 1≤n≤200.

7. The method for preparing the polymer electrolyte of claim 6, wherein before adding the nitrogen compound or phosphorus compound to the polymer, the method further comprises a step of modifying the terminal of the polymer comprising the ethylene oxide unit with a hydroxyl group or an amine group.

8. An all-solid-state battery comprising a positive electrode, a negative electrode, and a solid polymer electrolyte interposed therebetween, wherein the solid polymer electrolyte is the polymer electrolyte of claim 1.

* * * * *